US012663980B2

(12) United States Patent     (10) Patent No.:   US 12,663,980 B2
Fan et al.                            (45) Date of Patent:      Jun. 23, 2026

(54) SOFTWARE UPDATE METHOD AND DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Xichao Fan, Beijing (CN); Zhipeng Lu, Beijing (CN); Biqi Li, Beijing (CN); Yazhou Ren, Beijing (CN); Yali Wang, Beijing (CN); Feng Qu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 206 days.

(21) Appl. No.: 18/546,283

(22) PCT Filed: Oct. 19, 2022

(86) PCT No.: PCT/CN2022/126282

§ 371 (c)(1),
(2) Date: Aug. 14, 2023

(87) PCT Pub. No.: WO2024/082191

PCT Pub. Date: Apr. 25, 2024

(65) Prior Publication Data

US 2025/0021324 A1     Jan. 16, 2025

(51) Int. Cl.
*G06F 8/65*          (2018.01)

(52) U.S. Cl.
CPC ...................................... *G06F 8/65* (2013.01)

(58) Field of Classification Search
CPC ............................... G06F 8/61–65; G06F 8/71
See application file for complete search history.

(56) References Cited

U.S. PATENT DOCUMENTS

2015/0286475 A1* 10/2015 Vangelov .................. G06F 8/65
                                                 717/170
2018/0324042 A1    11/2018   Watts
(Continued)

FOREIGN PATENT DOCUMENTS

| CN | 110290496 A | 9/2019 |
| CN | 110493294 A | 11/2019 |
| CN | 111638894 A | 9/2020 |

(Continued)

*Primary Examiner* — Duy Khuong T Nguyen
(74) *Attorney, Agent, or Firm* — Dority & Manning, P.A.

(57) ABSTRACT

A software update method includes: receiving, by a target vehicle, first indication information, the first indication information being used to instruct to report version information of target software; sending, by the target vehicle, current version information of the target software configured on the target vehicle to a first control node currently establishing a communication connection with the target vehicle; further, receiving, by the target vehicle, second indication information sent by the first control node, the second indication information being used to indicate updated version information of the target software; and updating, by the target vehicle, the target software according to the second indication information.

17 Claims, 14 Drawing Sheets

(56)        References Cited

U.S. PATENT DOCUMENTS

| | | | | |
|---|---|---|---|---|
| 2019/0187976 A1 * | 6/2019 | Lee | ......................... | H04W 4/44 |
| 2021/0337376 A1 * | 10/2021 | Shao | ....................... | H04W 4/06 |

FOREIGN PATENT DOCUMENTS

| | | | | | |
|---|---|---|---|---|---|
| CN | 112099845 A | 12/2020 | | | |
| CN | 112328294 A | 2/2021 | | | |
| CN | 114090057 A | 2/2022 | | | |
| CN | 114125000 A | 3/2022 | | | |
| EP | 4346187 A1 * | 4/2024 | .......... | G06F 11/1433 | |

* cited by examiner

YA14D170/210/250   FPGA FMQL45T900

S204

S2014, the target vehicle establishes a communication connection with a second control node S2042, the target vehicle sends first request information to the second control node S2043, the target vehicle updates the target software according to the update data after obtaining the update data S301, the target vehicle broadcasts the first indication information S302, the target vehicle receives current version information of the target software configured on the second vehicle sent by the second vehicle S303, the target vehicle determines whether the current version information of the target software configured on the second vehicle is the same as the updated version information of the target software according to the current version information sent by the second vehicle S304, the target vehicle sends third indication information to the second vehicle if the current version information of the target software configured on the second vehicle is different from the updated version information of the target software

FIG. 14

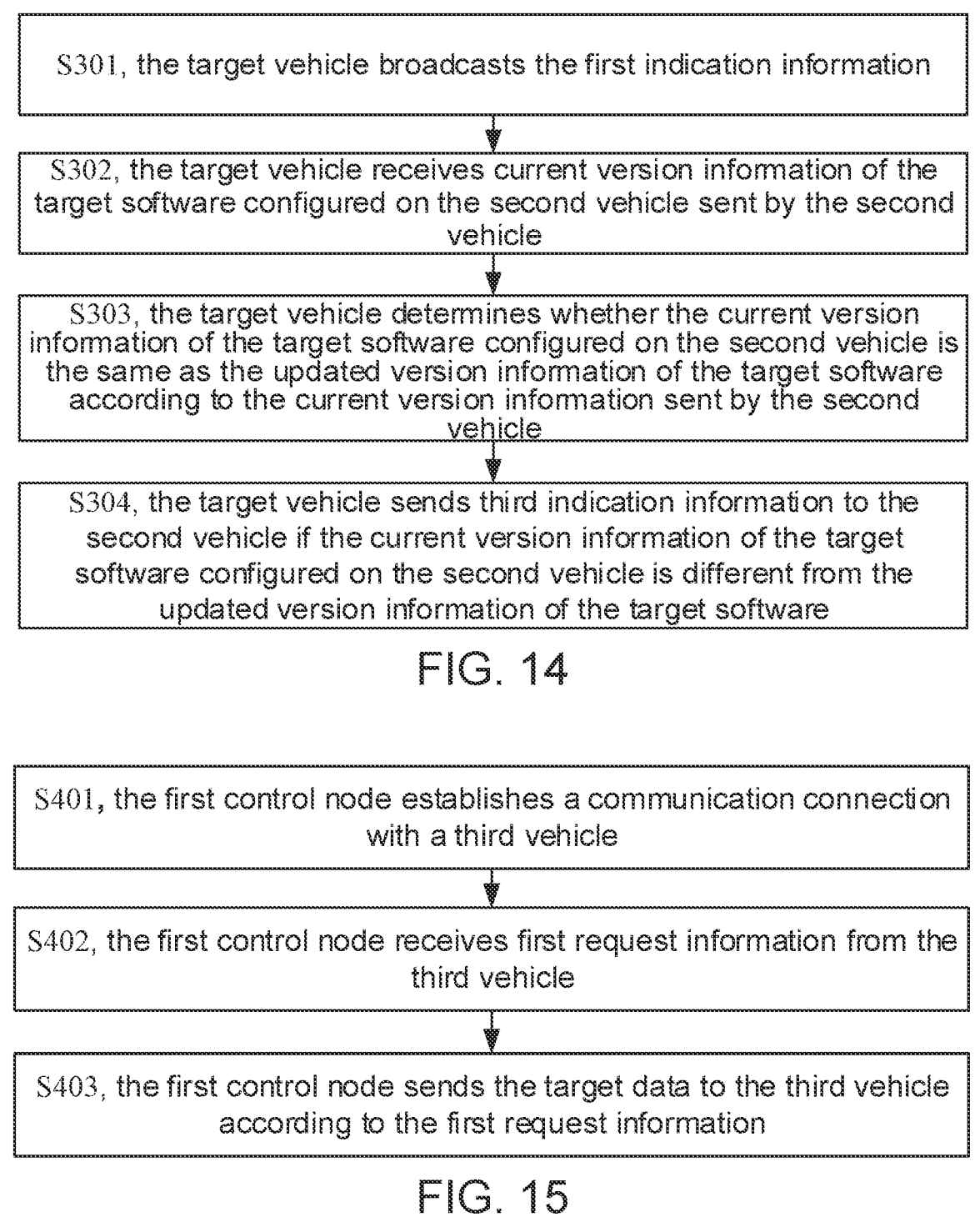

S401, the first control node establishes a communication connection with a third vehicle S402, the first control node receives first request information from the third vehicle S403, the first control node sends the target data to the third vehicle according to the first request information

FIG. 15

SOFTWARE UPDATE METHOD AND DEVICE

CROSS-REFERENCE TO RELATED APPLICATION

This application is a national phase entry under 35 USC 371 of International Patent Application No. PCT/CN2022/126282 filed on Oct. 19, 2022, which is incorporated herein by reference in its entirety.

TECHNICAL FIELD

The present disclosure relates to the field of computer technologies, and in particular, to a software update method and device.

BACKGROUND

With the application of intelligent networking technology in vehicles, an update rate of vehicle software is continuously increasing. However, at present, upgrade and maintenance of the vehicle software usually require users to drive their vehicles to a designated place for professional technicians to complete. This makes a process of upgrading the vehicle software cumbersome and inefficient.

SUMMARY

In a first aspect, a software update method is provided. The software update method is applied to a target vehicle. The method includes: receiving, by the target vehicle, first indication information, the first indication information being used to instruct to report version information of target software; sending, by the target vehicle, current version information of the target software configured on the target vehicle to a first control node currently establishing a communication connection with the target vehicle; further receiving, by the target vehicle, second indication information sent by the first control node, the second indication information being used to indicate updated version information of the target software; and updating, by the target vehicle, the target software according to the second indication information.

In some embodiments, the first control node includes any one of: a server, a first vehicle and a mobile terminal. The first vehicle carries the updated version information of the target software.

In some embodiments, if the first control node is the first vehicle, a distance between the first vehicle and the target vehicle is less than or equal to a preset distance.

In some embodiments, if the first control node is the mobile terminal, "receiving, by the target vehicle, the first indication information" includes: receiving, by the target vehicle, the first indication information sent by the mobile terminal, where the first indication information is generated by the mobile terminal in response to a first operation, the first operation being an operation for updating the version information of the target software.

In some embodiments, the second indication information includes a uniform resource locator (URL), the URL being associated with the updated version information; and "updating, by the target vehicle, the target software according to the second indication information" includes: obtaining update data corresponding to the target software from the first control node according to the URL, and updating the target software according to the update data.

In some embodiments, "updating, by the target vehicle, the target software according to the second indication information" includes: establishing, by the target vehicle, a communication connection with a second control node in response to a result that the target vehicle is disconnected from the first control node during a process of obtaining update data corresponding to the target software from the first control node, and continuing, by the target vehicle, to obtain the update data from the second control node according to the second indication information; and updating the target software according to the update data after obtaining the update data.

In some embodiments, after updating, by the target vehicle, the target software according to the second indication information, the method further includes: broadcasting, by the target vehicle, the first indication information; receiving, by the target vehicle, current version information of the target software configured on the second vehicle sent by the second vehicle, the second vehicle establishing a communication connection with the target vehicle; determining, by the target vehicle, whether the current version information of the target software configured on the second vehicle is same as the updated version information of the target software according to the current version information sent by the second vehicle; and if the current version information of the target software configured on the second vehicle is different from the updated version information of the target software, sending, by the target vehicle, third indication information to the second vehicle, the third indication information being used to indicate the updated version information of the target software.

In some embodiments, after updating, by the target vehicle, the target software according to the second indication information, the method further includes: sending a first response message to the first control node, the first response message being used to indicate that the target software configured on the target vehicle is updated successfully.

In a second aspect, another software update method is provided. The software update method is applied to a first control node. The method includes: broadcasting, by the first control node, first indication information after obtaining updated version information of target software, the first indication information being used to instruct a target vehicle to report current version information of the target software as configured; receiving, by the first control node, the current version information sent by the target vehicle, where the first control node is communicatively connected with the target vehicle, and the target vehicle is configured with the target software; and if it is determined that the current version information of the target software configured on the target vehicle is different from the updated version information of the target software, sending, by the first control node, second indication information to the target vehicle, the second indication information being used to indicate the updated version information of the target software.

In some embodiments, the method further includes: establishing, by the first control node, a communication connection with a third vehicle; receiving, by the first control node, first request information from the third vehicle, the first request information being used to request to obtain target data, where the target data is all or part of update data corresponding to the target software; and sending, by the first control node, the target data to the third vehicle according to the first request information.

In some embodiments, the first control node includes any one of: a server, a first vehicle and a mobile terminal.

In some embodiments, if the first control node is a first vehicle, a distance between the first vehicle and the target vehicle is less than or equal to a preset distance.

In a third aspect, a software update device is provided. The software update device is applied to a target vehicle, the target vehicle being configured with target software, and the device includes a receiving unit, a sending unit and a processing unit. The receiving unit is configured to receive first indication information, the first indication information being used to instruct to report version information of the target software. The sending unit is configured to send current version information of the target software configured on the target vehicle to a first control node currently establishing a communication connection. The receiving unit is further configured to receive second indication information sent by the first control node, the second indication information being used to indicate updated version information of the target software. The processing unit is configured to update the target software according to the second indication information.

In some embodiments, the first control node includes any one of: a server, a first vehicle and a mobile terminal. The first vehicle includes the updated version information of the target software.

In some embodiments, in a case where the first control node is the first vehicle, a distance between the first vehicle and the target vehicle is less than or equal to a preset distance.

In some embodiments, the receiving unit is configured to, in a case where the first control node is the mobile terminal, receive the first indication information sent by the mobile terminal, where the first indication information is generated by the mobile terminal in response to a first operation of a user, the first operation being an operation for the user to update the version information of the target software.

In some embodiments, the second indication information includes a uniform resource locator (URL), the URL being associated with the updated version information; the processing unit is configured to: obtain update data corresponding to the target software from the first control node according to the URL, and update the target software according to the update data.

In some embodiments, the processing unit is configured to: disconnect from the first control node during a process of obtaining update data corresponding to the target software from the first control node, cause the target vehicle to establish a communication connection with a second control node, and continue to obtain the update data from the second control node according to the second indication information; and update the target software according to the update data after obtaining the update data.

In some embodiments, the sending unit is further configured to broadcast the first indication information after the processing unit updates the target software according to the second indication information. The receiving unit is further configured to receive current version information of the target software configured on a second vehicle sent by the second vehicle, the second vehicle establishes a communication connection with the target vehicle. The processing unit is further configured to determine whether the current version information of the target software configured on the second vehicle is same as the updated version information of the target software according to the current version information sent by the second vehicle. The sending unit is further configured to send third indication information to the second vehicle in a case where the current version information of the target software configured on the second vehicle is different from the updated version information of the target software, the third indication information being used to indicate the updated version information of the target software.

In some embodiments, the sending unit is further configured to: send a first response message to the first control node after the processing unit updates the target software according to the second indication information, the first response message being used to indicate that the target software configured on the target vehicle is updated successfully.

In a fourth aspect, another software update device is provided. The software update device is applied to a first control node, and the device includes a sending unit, a receiving unit, and a processing unit. The sending unit is configured to broadcast first indication information after obtaining updated version information of target software, the first indication information being used to instruct a vehicle to report current version information of the target software as configured. The receiving unit is configured to receive the current version information sent by the target vehicle, the first control node being communicatively connected with the target vehicle. The processing unit is configured to send second indication information to the target vehicle in a case where it is determined that the current version information of the target software configured on the target vehicle is different from the updated version information of the target software, the second indication information being used to indicate the updated version information of the target software.

In some embodiments, the processing unit is further configured to: establish a communication connection with a third vehicle; receive first request information from the third vehicle, the first request information being used to request to obtain target data, where the target data is all or part of update data corresponding to the target software; and send the target data to the third vehicle according to the first request information.

In some embodiments, the first control node includes any one of: a server, a vehicle and a mobile terminal.

In some embodiments, in a case where the first control node is the vehicle, a distance between the vehicle and the target vehicle is less than or equal to a preset distance.

In a fifth aspect, a software update device is provided. The software update device is applied to a target vehicle, the target vehicle being configured with target software. The software update device includes: a processor and a communication interface, where the communication interface is coupled to the processor, and the processor is configured to run computer programs or instructions to perform: receiving first indication information, the first indication information being used to instruct to report version information of the target software; sending current version information of the target software configured on the target vehicle to a first control node currently establishing a communication connection with the target vehicle: receiving second indication information sent by the first control node, the second indication information being used to indicate updated version information of the target software; and updating the target software according to the second indication information.

In some embodiments, the processor is configured to run the computer programs or the instructions, in a case where the first control node is a mobile terminal, to perform: receiving the first indication information sent by the mobile terminal, where the first indication information is generated by the mobile terminal in response to a first operation, the first operation being an operation for updating the version information of the target software.

In some embodiments, the second indication information includes a uniform resource locator (URL), the URL being associated with the updated version information; the processor is configured to run the computer programs or the instructions to perform: obtaining update data corresponding to the target software from the first control node according to the URL, and updating the target software according to the update data.

In some embodiments, the processor is configured to run the computer programs or the instructions to perform: establishing a communication connection with a second control node in response to a result that the target vehicle is disconnected from the first control node during a process of obtaining update data corresponding to the target software from the first control node, and continuing to obtain the update data from the second control node according to the second indication information; and updating the target software according to the update data after obtaining the update data.

In some embodiments, the processor is configured to run the computer programs or the instructions to further perform: broadcasting the first indication information: receiving current version information of the target software configured on a second vehicle sent by the second vehicle, the second vehicle establishes a communication connection with the target vehicle; determining whether the current version information of the target software configured on the second vehicle is same as the updated version information of the target software according to the current version information sent by the second vehicle; and sending third indication information to the second vehicle in a case where the current version information of the target software configured on the second vehicle is different from the updated version information of the target software, the third indication information being used to indicate the updated version information of the target software.

In some embodiments, the processor is configured to run the computer programs or the instructions to further perform: sending a first response message to the first control node, the first response message being used to indicate that the target software configured on the target vehicle is updated successfully.

In a sixth aspect, another software update device is provided. The software update device is applied to a target vehicle, the target vehicle being configured with target software. The software update device includes: a processor and a communication interface, where the communication interface is coupled to the processor, and the processor is configured to run computer programs or instructions to implement the software update method according to the second aspect.

In a seventh aspect, a non-transitory computer-readable storage medium is provided. The non-transitory computer-readable storage medium has stored instructions that, when executed on a computer, cause the computer to perform the software update method according to the first aspect or the software update method according to the second aspect.

BRIEF DESCRIPTION OF THE DRAWINGS

In order to describe technical solutions in some embodiments of the present disclosure more clearly, the accompanying drawings to be used in some embodiments of the present disclosure will be introduced briefly; obviously, the accompanying drawings to be described below are merely some embodiments of the present disclosure, and a person of ordinary skill in the art can obtain other drawings according to those drawings. In addition, accompanying drawings in the following description may be regarded as schematic diagrams, and are not limitations on an actual size of a product, an actual process of a method and an actual timing of signals involved in the embodiments of the present disclosure.

Figure 1:
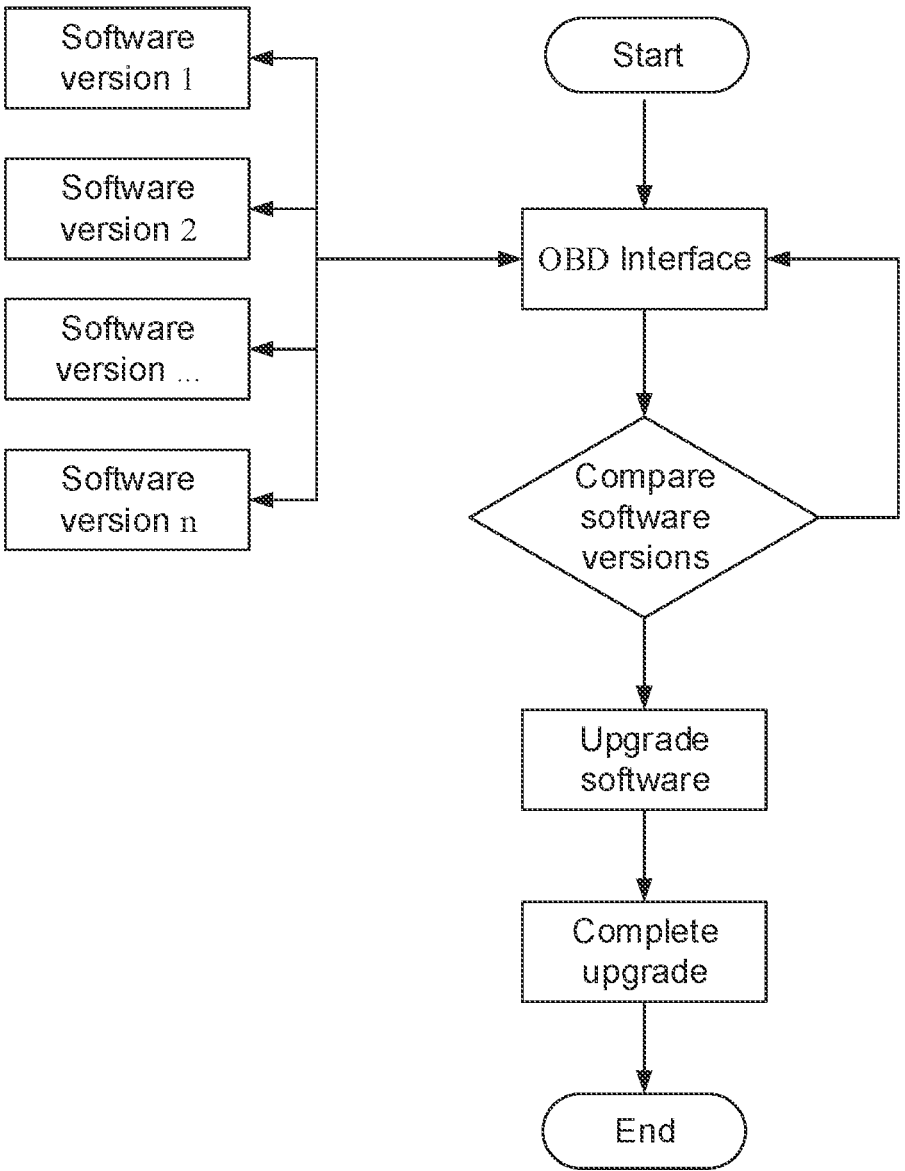
Figure 2:
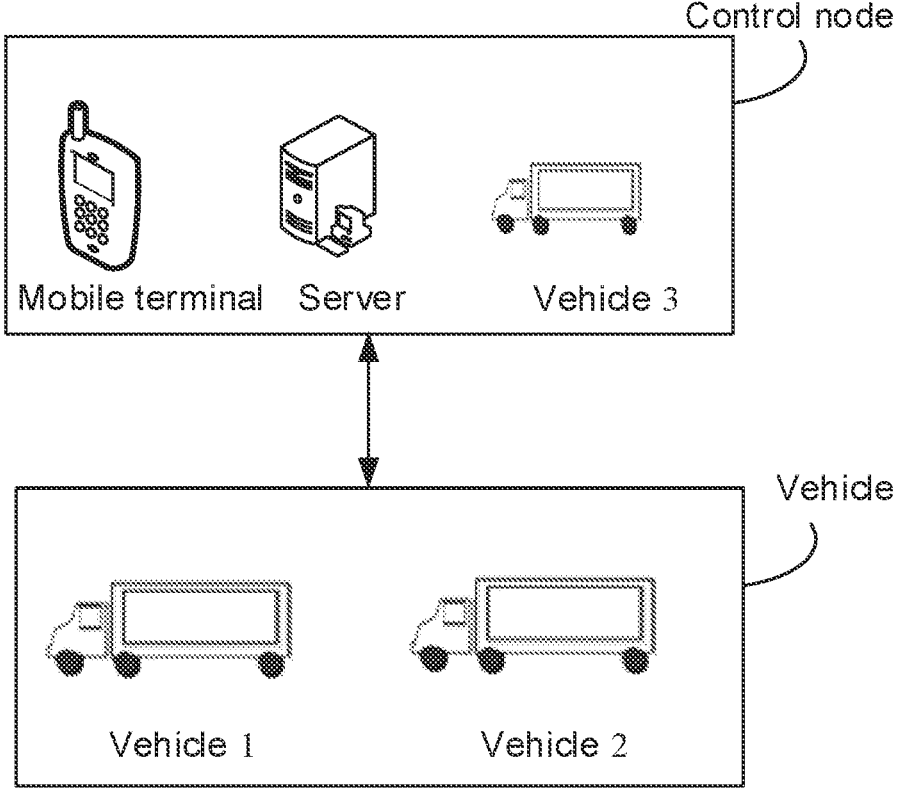
Figure 3:
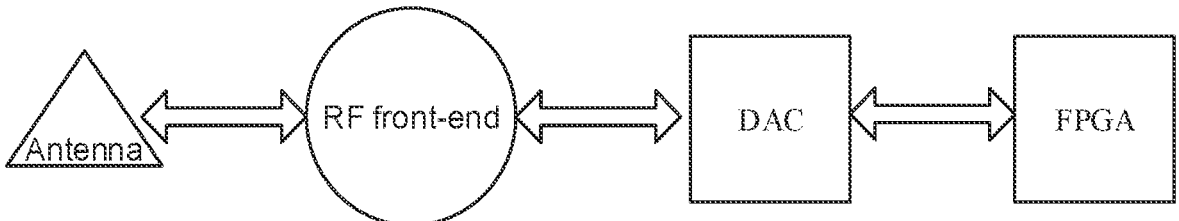
Figure 4:
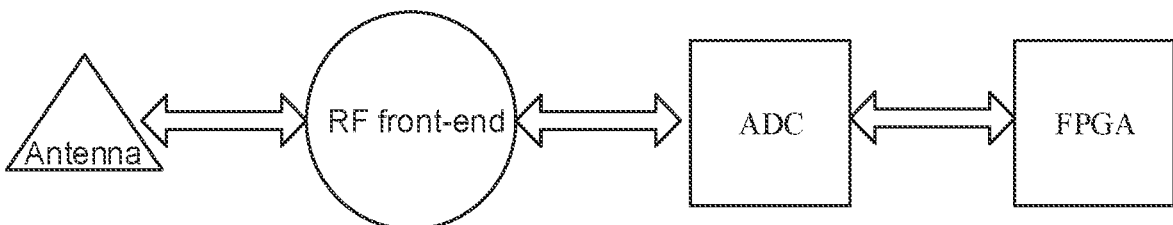
Figure 5:
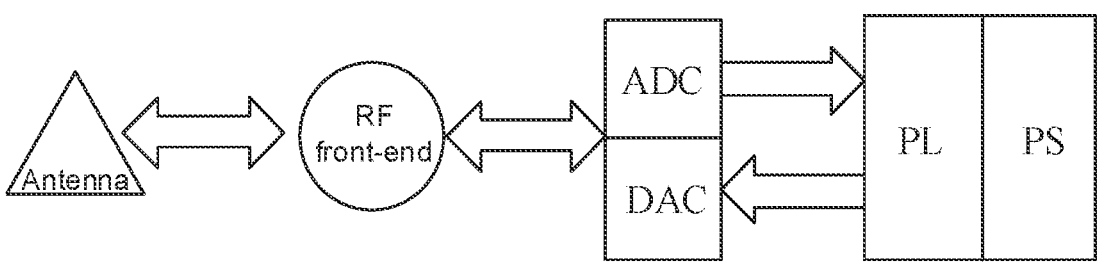
Figure 6:
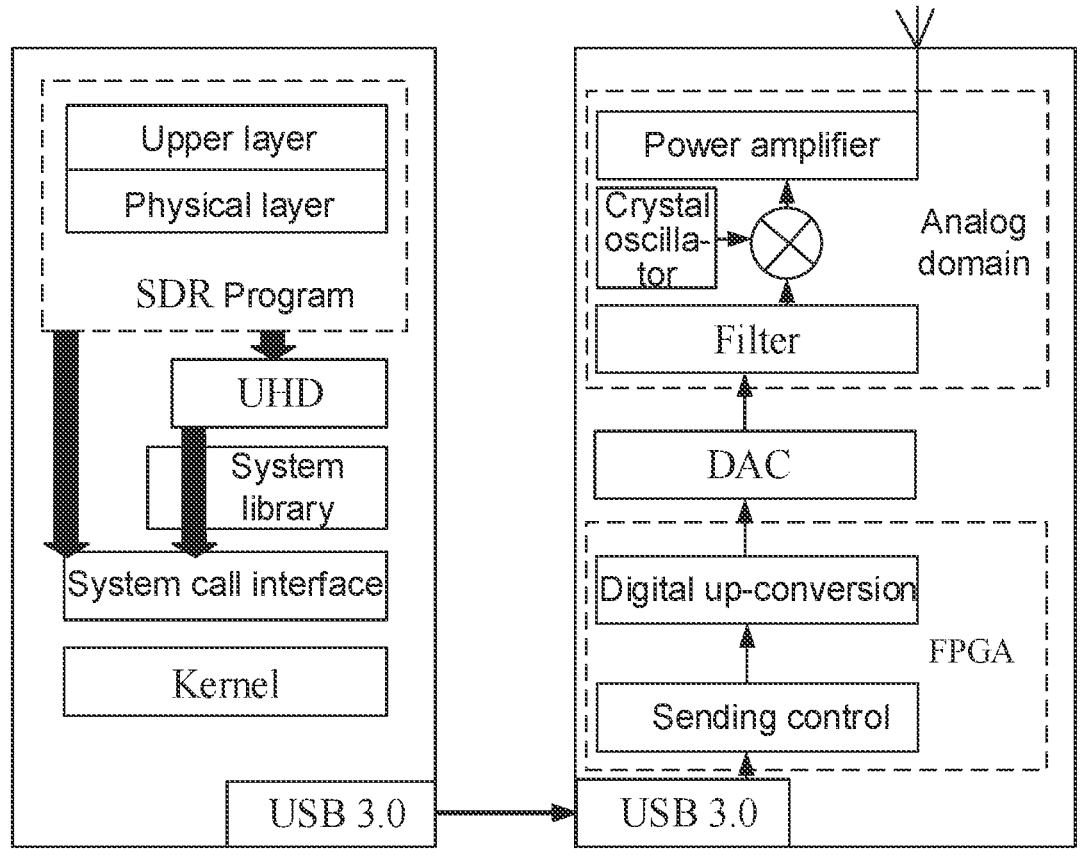
Figure 7:
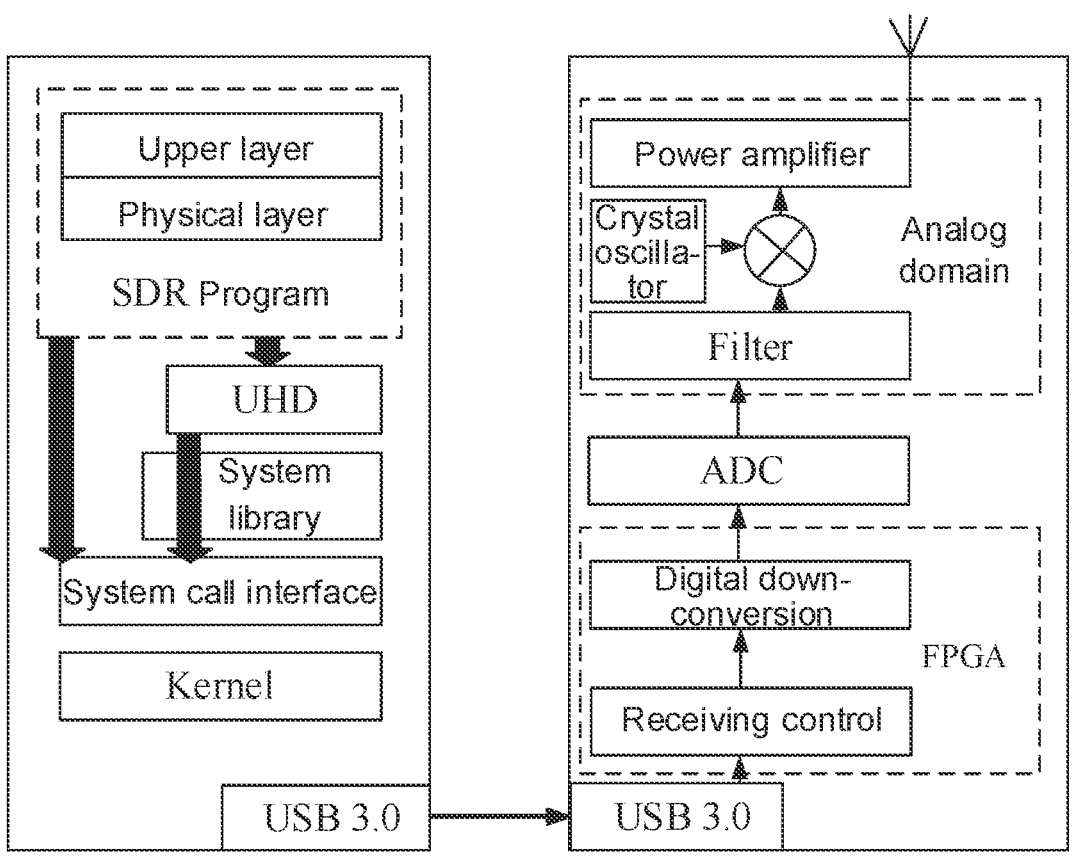
Figure 8:
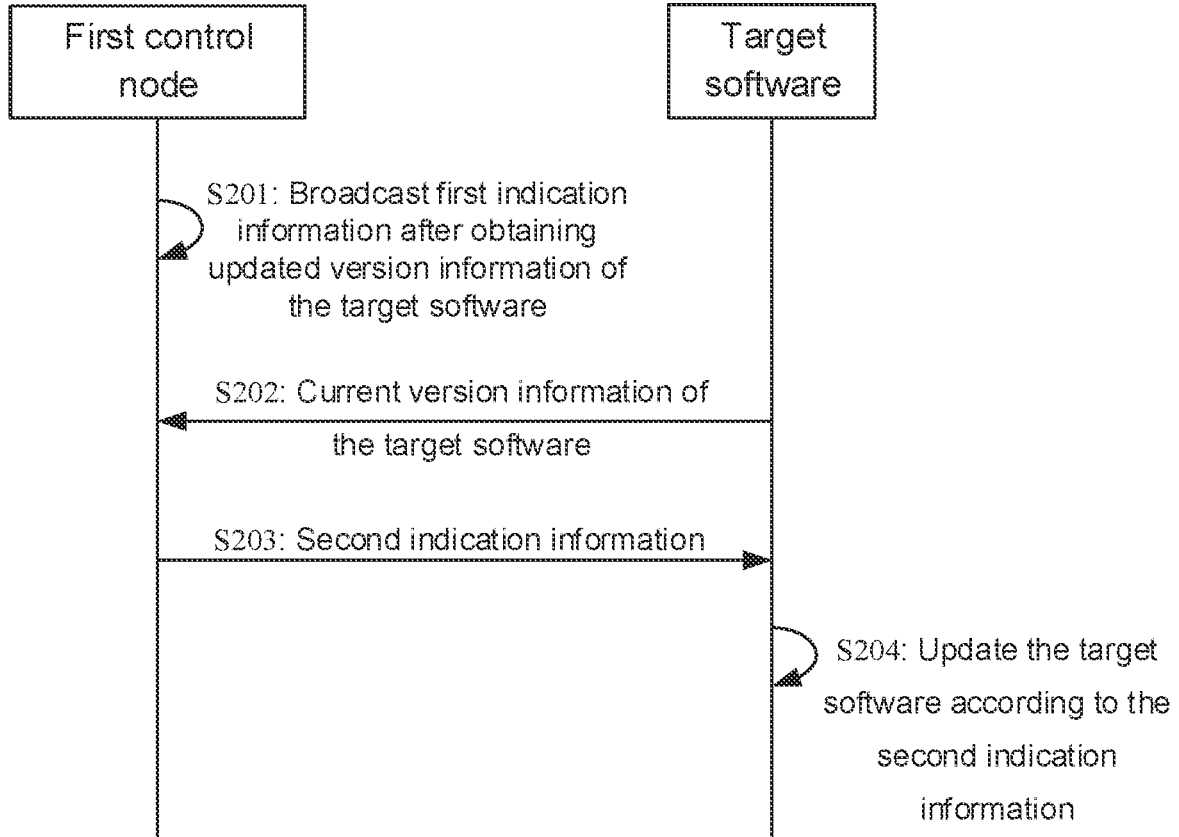
Figure 9:
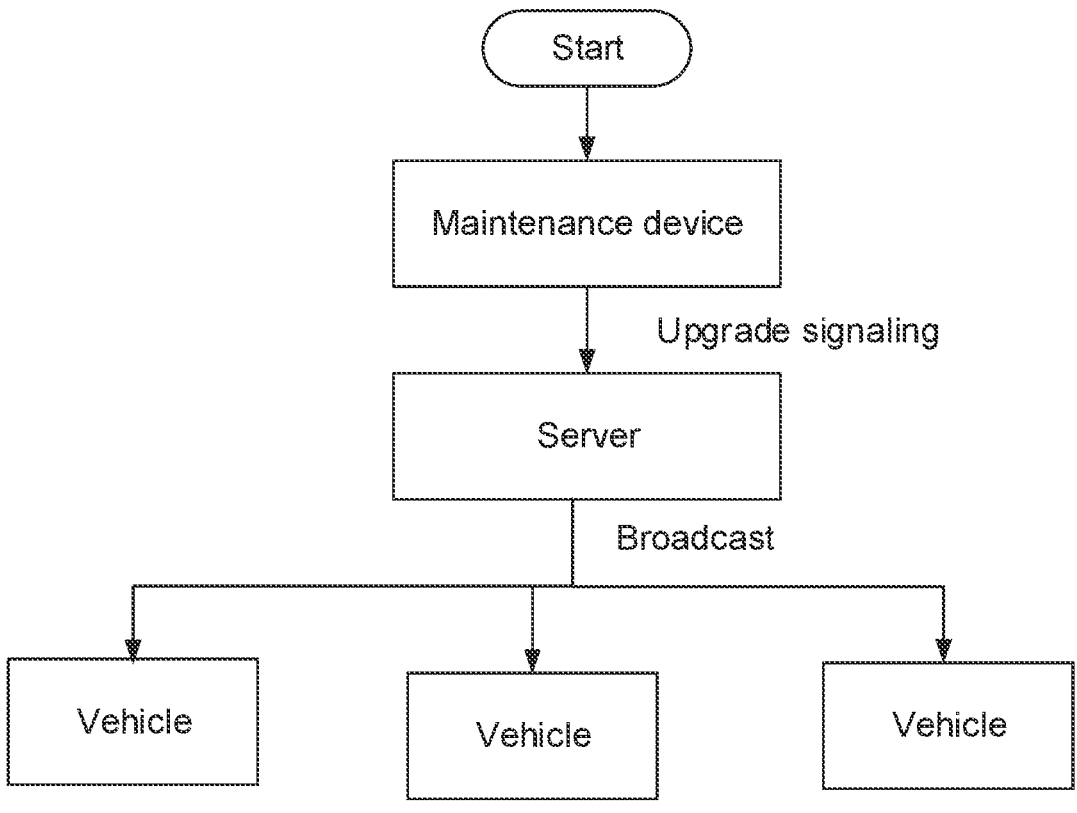
Figure 10:
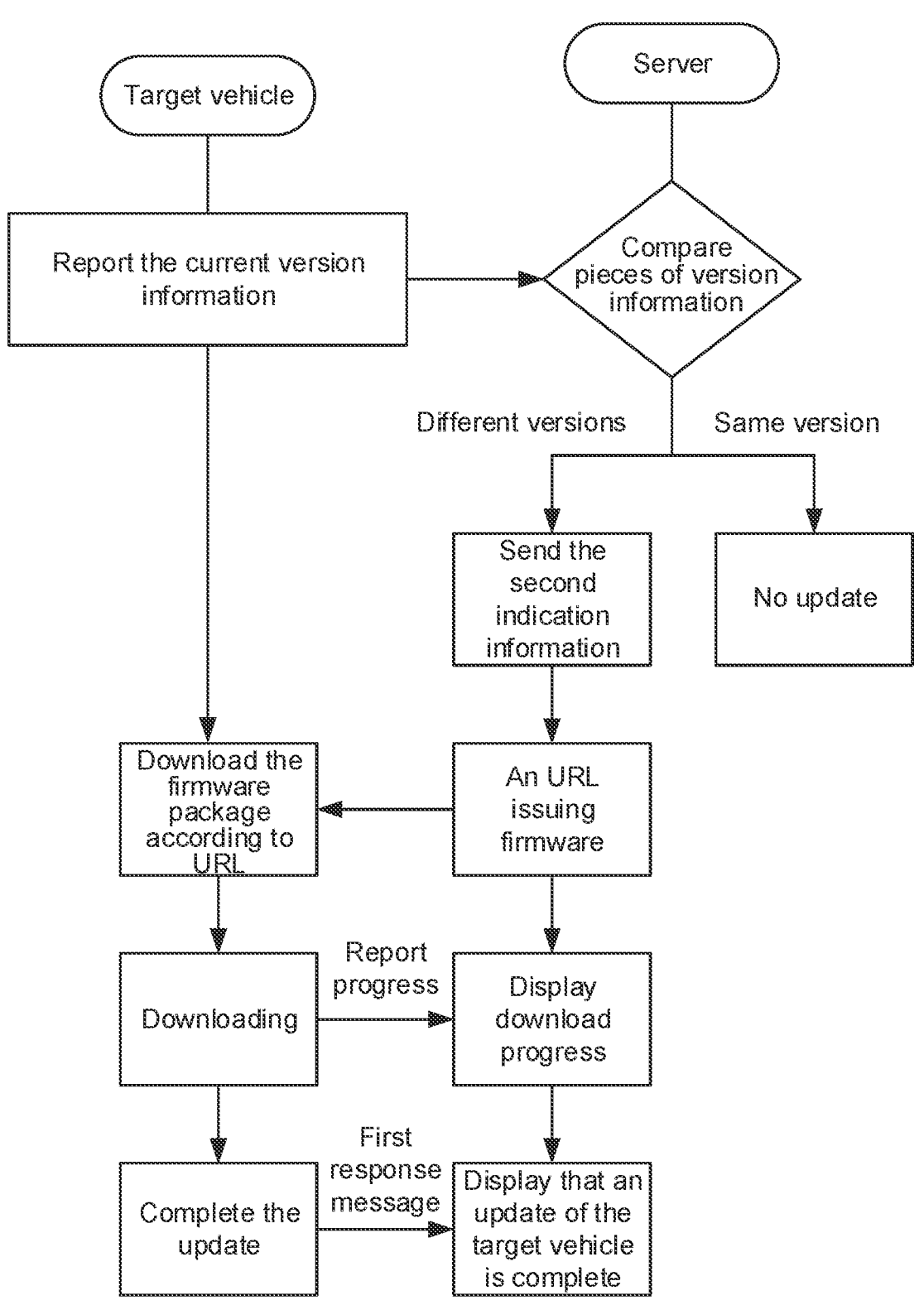
Figure 11:
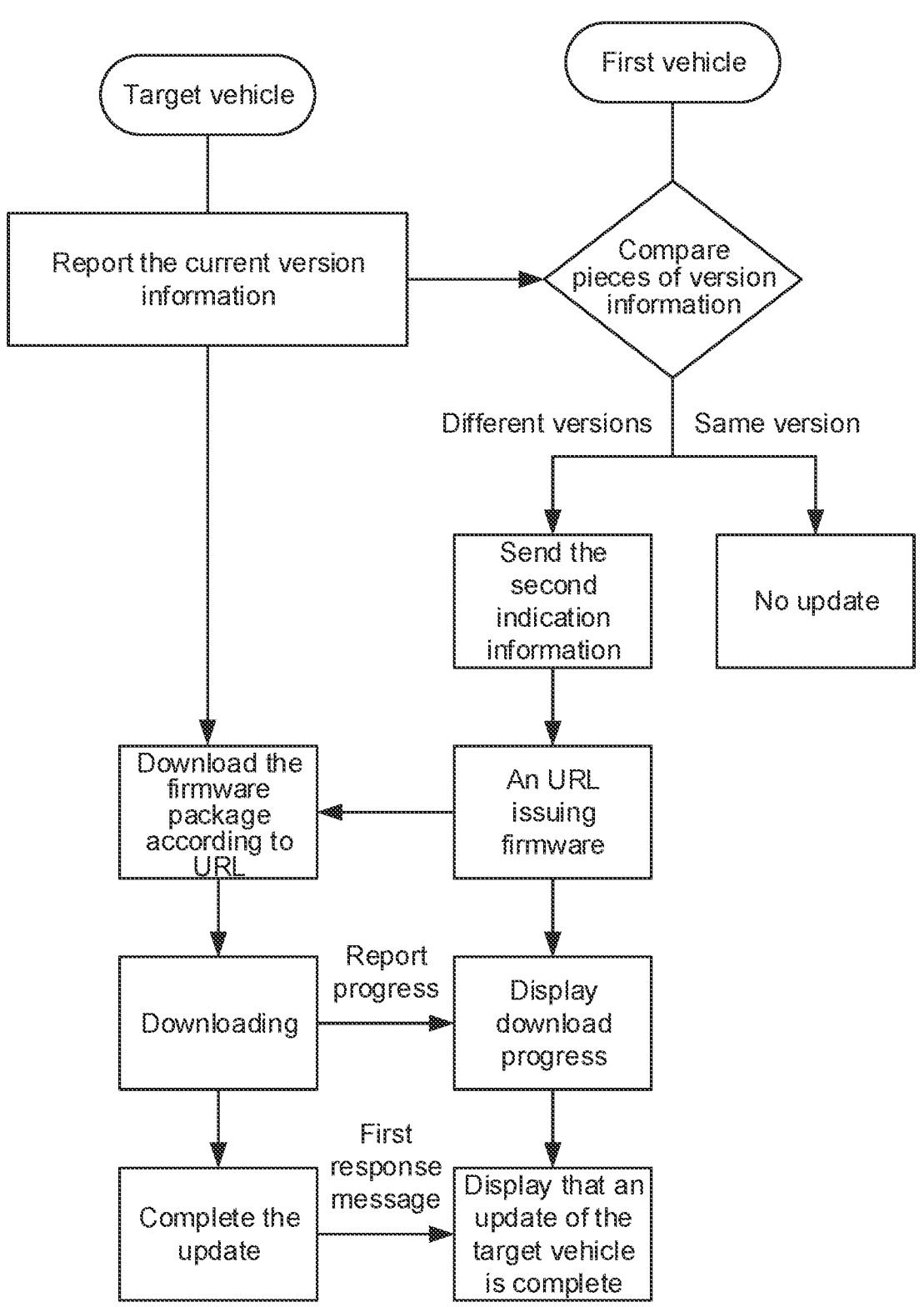
Figure 12:
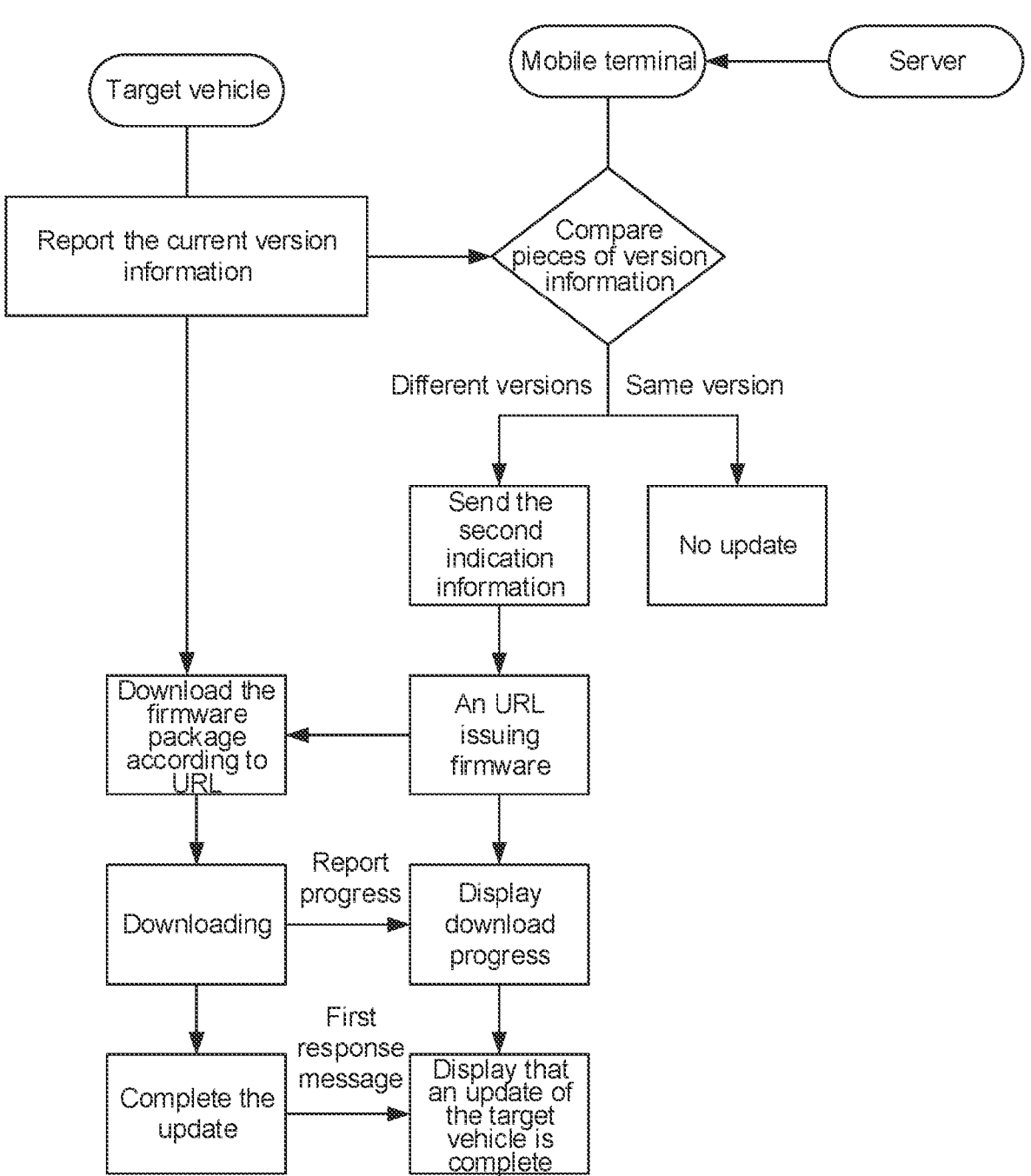
Figure 13:
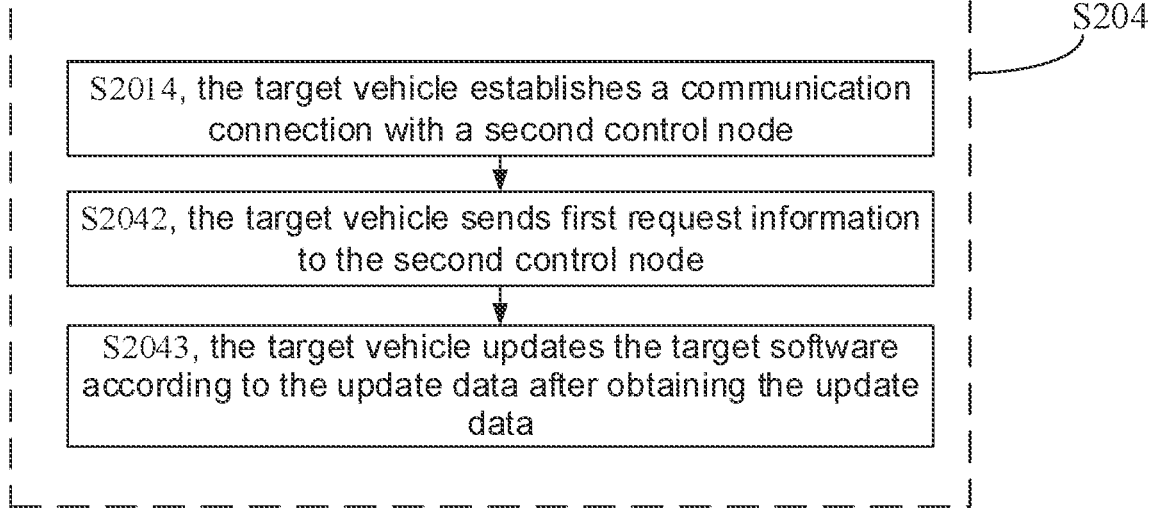
Figure 16:
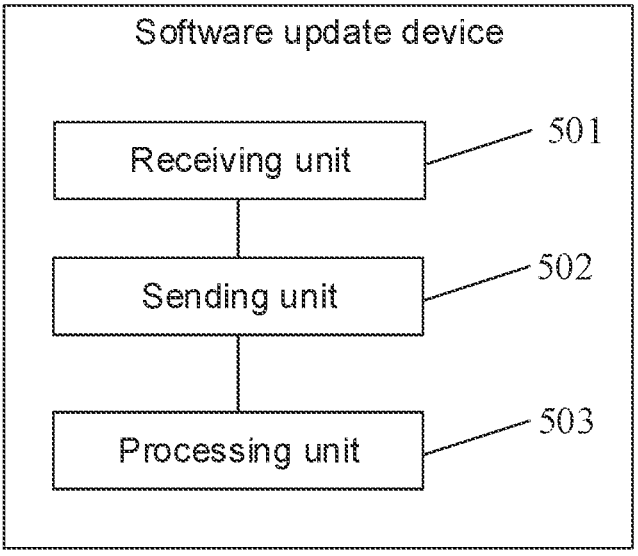
Figure 17:
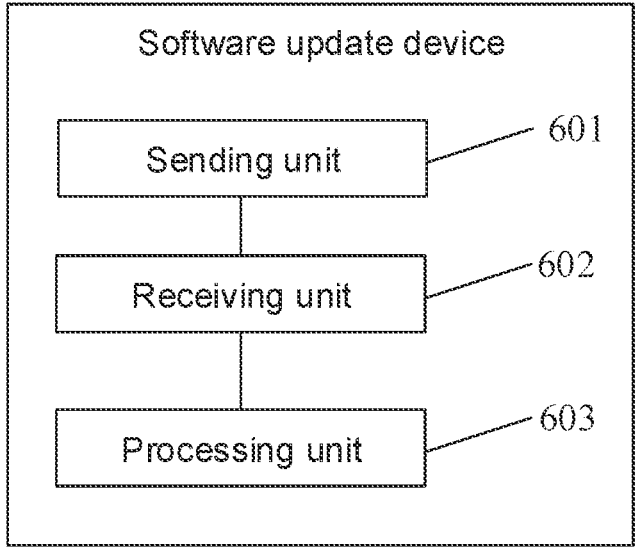
Figure 18:
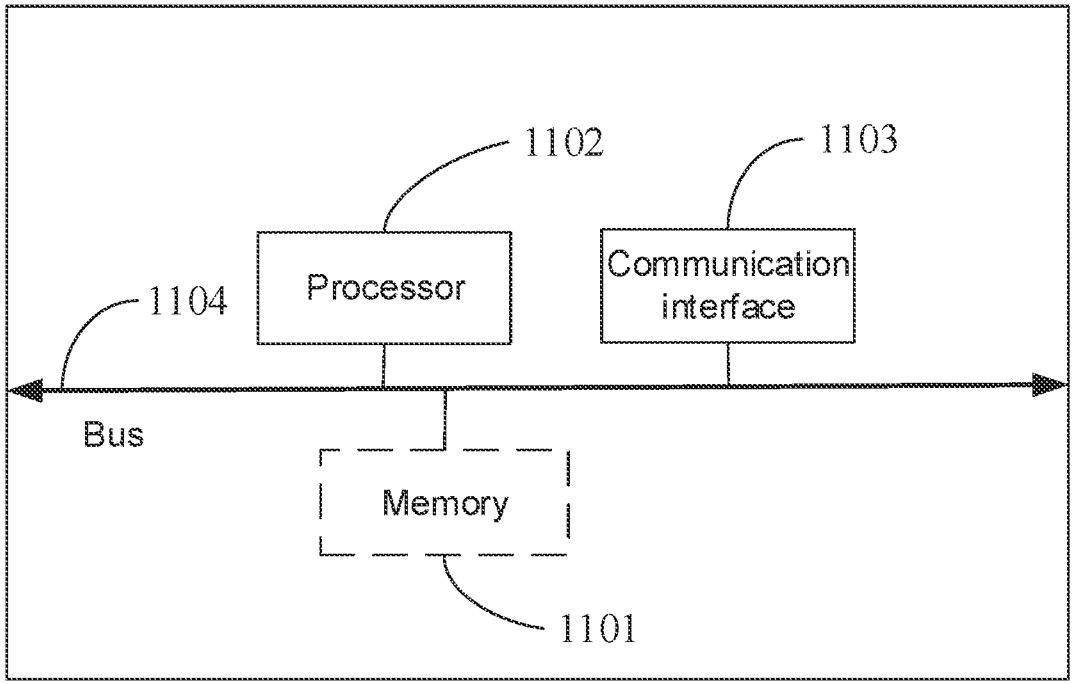

FIG. 1 is a flow diagram of a solution for upgrading vehicle software in accordance with some embodiments;

FIG. 2 is a structural diagram of a network architecture in accordance with some embodiments:

FIG. 3 is a first structural diagram of communication modules of a vehicle in accordance with some embodiments;

FIG. 4 is a second structural diagram of communication modules of a vehicle in accordance with some embodiments;

FIG. 5 is a third structural diagram of communication modules of a vehicle in accordance with some embodiments;

FIG. 6 is a first diagram showing a process of transmitting vehicle signals in accordance with some embodiments;

FIG. 7 is a second diagram showing a process of transmitting vehicle signals in accordance with some embodiments;

FIG. 8 is a first flow diagram of a software update method in accordance with some embodiments;

FIG. 9 is a second flow diagram of a software update method in accordance with some embodiments;

FIG. 10 is a third flow diagram of a software update method in accordance with some embodiments;

FIG. 11 is a fourth flow diagram of a software update method in accordance with some embodiments:

FIG. 12 is a fifth flow diagram of a software update method in accordance with some embodiments;

FIG. 13 is a sixth flow diagram of a software update method in accordance with some embodiments;

FIG. 14 is a seventh flow diagram of a software update method in accordance with some embodiments;

FIG. 15 is an eighth flow diagram of a software update method in accordance with some embodiments;

FIG. 16 is a first structural diagram of a software update device in accordance with some embodiments;

FIG. 17 is a second structural diagram of a software update device in accordance with some embodiments; and FIG. 18 is a structural diagram of a communication device in accordance with some embodiments.

DETAILED DESCRIPTION

The technical solutions in some embodiments of the present disclosure will be described clearly and completely with reference to the accompanying drawings; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more features. In the description of the embodiments of the present disclosure, "a/the plurality of" means two or more unless otherwise specified.

Some embodiments may be described using the expressions "coupled" and "connected" along with their derivatives. For example, the term "connected" may be used in the description of some embodiments to indicate that two or more components are in direct physical or electrical contact with each other. As another example, the term "connected" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The phrase "A and/or B" includes following three combinations: only A, only B, and a combination of A and B.

As used herein, the term "if" is, optionally, construed to mean "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

In the following, terms involved in the embodiments of the present disclosure are explained for the convenience of readers' understanding.

Over-the-air (OTA) technology is a technology for remote management of subscriber identity module (SIM) card data and applications through an air interface of mobile communication. The air interface can adopt wireless application protocol (WAP), general packet radio service (GPRS), third-generation mobile communication technology (3rd-Generation, 3G), fourth-generation mobile communication technology (4th-Generation, 4G), fifth-generation mobile communication technology (5th-Generation, 5G) and short message technology, as well as peer-to-peer transmission of a non-public network.

The application of OTA technology enables mobile communication to not only provide voice and data services, but also new business downloads. This allows application and content service providers to continually develop services that are more personalized and tailored to needs of users without being limited by platforms, such as information on demand, interactive entertainment, location services, and banking transactions. With OTA technology, the users only need to perform simple operations on their mobile phones (such as clicking to download a certain application); in response to an operation of a user, a mobile phone can send a request for obtaining installation data of the application to a server that can provide the installation data of the application. Afterwards, the mobile phone can parse the data upon receipt of the installation data from the server, and then complete the installation of the application. In this way, needs of the users are met. Therefore, it is possible to obtain various business data that the users need from the network based on OTA technology. Of course, OTA technology can also customize specific services according to wishes of the users.

OTA technology can also be applied to multiple technical fields, such as the field of smart home appliances and the field of Internet of vehicles. In a case where OTA technology is applied to the field of Internet of vehicles, it is possible to achieve software updates for a vehicle. Here, the software updates for the vehicle may include a firmware upgrade for the vehicle. Specifically, the firmware upgrade refers to an upgrade of firmware embedded in devices of the vehicle. The devices may be portable devices such as a music player device, a video player device, a navigation device, and a master control device. Based on the firmware upgrade, it is possible to complete the system performance of the vehicle terminal, enhance the system stability of the vehicle terminal, and repair the system loopholes of the vehicle terminal.

In an example, the vehicle can download a firmware package corresponding to the firmware through OTA technology, and implement the firmware upgrade according to the firmware package.

Firmware usually refers to the software that is responsible for the most basic and bottom-level work of a system (hereinafter, collectively referred to as software for a unified description). With the continuous development of computer technology, the difference between firmware and general applications has become smaller and smaller. That is, in some descriptions, firmware may be used as an application.

The firmware package usually refers to an image compression package of the system. When the vehicle is upgrading the firmware, the firmware package can be directly decompressed to obtain installation data of new firmware. In this way, the vehicle can use the installation data to replace original firmware installation data to complete the firmware upgrade.

With the application of intelligent networking technology in vehicles, an update rate of vehicle software is continuously increasing. From the perspective of vehicle recall problems in recent years, the reasons for current vehicle recalls have extended from traditional hardware failures to design problems of system programs and software.

In a possible implementation, in a case where vehicle software needs to be updated, software upgrade operations can be performed on the vehicle by technicians through a maintenance device or memory (e.g., hard disk, USB flash disk, optical disk, etc.). For example, the maintenance device is used to access an on-board diagnostics (OBD) system interface to detect a version of software. If the software for the vehicle is different from the updated software (for example, version information of the software currently installed on the vehicle is different from updated version information), in response to an update operation of the technicians, the vehicle may obtain the installation data of the updated software from the maintenance device, and update the software for the vehicle according to the installation data. Here, the update operation may refer to an operation in which the technicians select the version information that matches the vehicle from multiple pieces of version information of the software.

Here, the maintenance device may refer to a device configured with the installation data of the updated software. For example, the maintenance device may include computers, tablet computers, and mobile phones.

In some scenarios, in a case where the technicians use a memory to upgrade the vehicle software, the memory may be configured with the installation data of the updated software. The vehicle has an interface for accessing/installing the memory, for example, the vehicle may have an optical drive. When the vehicle reads data in the memory through the optical drive, the vehicle can compare whether the version information of the software in the memory is consistent with the current version information of the software for the vehicle. If they are inconsistent, the vehicle will upgrade for software. If they are consistent, the vehicle will not need to upgrade the software.

Specifically, as shown in FIG. 1, versions of software configured on the maintaining device may include software version 1 to software version n, where n is a positive integer. FIG. 1 shows a solution for upgrading vehicle software. After upgrading the vehicle software, a manufacturer notifies users to go to a designated place for professional technicians to perform upgrading process. After a vehicle of a user arrives at the designated place, the technicians connect the maintenance device to the vehicle. Further, the technicians compare a current version of the software for the vehicle with the latest version of the software in the maintenance device, and if the current version of the software for the vehicle is different from the latest version of the software, the software for the vehicle will be upgraded.

Here, the maintenance device can be connected to an OBD interface on the vehicle to realize a connection with the vehicle. The OBD interface may include a universal serial bus (USB) interface, a recommended standard 485 (RS-485) communication interface, a DB9 serial connection interface, and the like. In addition, in a case where the maintenance device is an optical disk, the maintenance device can be connected to the vehicle by being placed in the optical drive of the vehicle.

In some embodiments, after completing an upgrade of the software, the vehicle may output a message that the upgrade is complete. For example, the message may be output in the form of voice broadcast. Alternatively, in a case where the vehicle has a display, the message may be displayed via the display.

It can be seen that the upgrade and maintenance of the software for vehicles in the above method require the users to drive their vehicles to the designated place and be completed by professional technicians. As a result, it is cumbersome to upgrade the software for vehicles and the upgrade efficiency is low. Moreover, in a case where a vehicle is far away from the designated place, it takes more time for the users; and if the software to be upgraded is related to driving safety, it brings driving risks to the users. Therefore, the above method reduces the experience of the users.

In view of this, embodiments of the present disclosure provide an OTA-based software update method, which is applied to vehicles. The method includes: after receiving indication information for instructing to report version information of software, reporting, by a vehicle, current version information of the software configured on the vehicle to a control node currently establishing a connection. The control node may send a message for indicating version information of upgraded software to the vehicle in a case where the current version of the software configured on the vehicle is inconsistent with the version information of the upgraded software. In this way, the vehicle can download the update data of the upgraded software according to the message, and upgrade the software. For example, when the vehicle receives a download link of update data of the software sent from the control node during the moving process, the vehicle can download the update data of the software according to the download link, and then perform an update according to the downloaded update data. In this way, the vehicle can update the software in time, which improves the user experience.

It will be noted that in the embodiments of the present disclosure, the term "vehicle" may refer to a vehicle terminal, or may refer to a device installed with software in a vehicle.

Embodiments of the present disclosure will be described in detail below with reference to the accompanying drawings.

FIG. 2 is a schematic diagram of a network architecture provided by embodiments of the present disclosure. As shown in FIG. 2, the network architecture may include vehicles (such as Vehicle 1 and Vehicle 2) and control nodes (such as a mobile terminal, a server, and Vehicle 3). A vehicle can be communicatively connected with a control node. For example, in a case where the control node is a server or a mobile terminal, the vehicle can communicate with the control node through a mobile communication network (such as a 2G/3G/4G/5G network), and also communicate with the control node through a wireless local area network (WLAN) or Bluetooth. For another example, in a case where the control node is another vehicle, the vehicles may be connected through vehicle wireless communication technology (vehicle to x, V2X). The embodiments of the present disclosure do not limit the communication manner between the vehicle and the control node.

It will be noted that the updated version information of the target software is stored in the control node. The control node can be used to send a message to the vehicle instructing the vehicle to report the version information of the target software.

Here, the mobile terminal may be a user equipment (UE), a mobile station (MS) or a mobile terminal (MT), or the like. Specifically, the mobile terminal may be a mobile phone, a tablet computer, a laptop computer, a handheld computer, a notebook computer, an ultra-mobile personal computer (UMPC), a netbook, a cellular phone, a personal digital assistant (PDA), or a computer with a wireless transceiver function.

The server may be a cloud server, an OTA server, or a server cluster. The server may be a single server, or a server cluster composed of multiple servers. In some implementations, the server cluster may be a distributed cluster. The embodiments of the present disclosure do not limit the specific implementation of the server.

The vehicle is used to send the current version information of the target software configured on itself to the control node. Further, the control node is further used to send second indication information to the vehicle to indicate the updated version information of the target software. Accordingly, the vehicle is used to update the target software according to the second indication information.

In practical applications, the control node may be a mobile terminal, a server, a vehicle, or the like. In a case where the control node is a vehicle, the vehicle has stored updated version information of the target software, and the vehicle may serve as the control node to send the first indication information to other vehicles.

The vehicle may include communication modules to enable communication with the control node. The communication modules include an antenna (or antennas), a radio frequency (RF) front-end, an analog to digital converter (ADC), a digital to analog converter (DAC) and an application specific integrated circuit (ASIC).

Here, the antenna (or antennas) may include a transmitting antenna and a receiving antenna. The transmitting antenna can be used to transmit signals and the receiving antenna can be used to receive signals. The transmitting antenna and the receiving antenna may be a same antenna, or may be two different antennas. In a case where the transmitting antenna and the receiving antenna are the same antenna, the basic characteristic parameters of the antenna as transmitting or receiving are the same, that is, the reciprocity theorem in antennas.

The radio frequency front-end can be used to filter and amplify radio frequency signals. Main components in the radio frequency front-end include: a power amplifier (PA), a filter (Filter), a switch (Switch), a low noise amplifier (LNA), tuner (Tuner), duplex/multiplexer (Du/Multiplexer). In order to make the size of the radio frequency front-end smaller, the above-mentioned components may be integrated into one circuit to form a radio frequency integrated circuit (RFIC).

ADC is used to convert analog signals into digital signals. For example, the ADC may be an analog to digital (AD) chip.

DAC is used to convert digital signals into analog signals. For example, the DAC may be a digital to analog (DA) chip.

In some embodiments, the ADC and the DAC may be integrated on one chip, such as an AD and DA chip.

The application specific integrated circuit may be a chip (such as an artificial intelligence (AI) chip). The AI chip may be a field programmable gate array (FPGA) to increase the processing speed of data signals. FPGA can be divided into a processing system (PS) part and a programmable logic (PL) part, where the PS is a system-on-chip (SOC) of an Advanced RISC Machine (ARM) processor irrelevant to FPGA, and the PL is the part of FPGA. In practical applications, a model number of the FPGA of the vehicle may be configured as required. For example, a vehicle may be configured with an FPGA with a model number FMQL45T900 as shown in FIG. 5. It can be understood that using FPGA as the application specific integrated circuit may improve the processing speed of the communication modules of the vehicle.

As shown in FIG. 3, a processing process for signals in the communication modules may include: after receiving an initial signal, processing, by the FPGA, the initial signal to obtain a digital signal, and transmitting, by the FPGA, the digital signal to the DAC; after receiving the digital signal, converting, by the DAC, the digital signal into an analog signal; and amplifying, by the radio frequency front-end, the analog signal, and then sending out, by the transmitting antenna, the amplified analog signal.

As shown in FIG. 4, when the vehicle receives a signal sent by the control node, an analog signal is received by the antenna and transmitted to the radio frequency front-end; the received analog signal is processed in the radio frequency front-end for noise reduction and then transmitted to the ADC to be converted into a digital signal, and then the digital signal is transmitted to the FPGA for processing.

In practical applications, a high-speed AD and DA chip YA14D170/210/250 may serve as the ADC and the DAC in the communication modules, that is, the ADC and the DAC are integrated into the chip YA14D170/210/250. As shown in FIG. 5, when the communication modules receive a signal through the receiving antenna, an analog signal is converted into a digital signal by the chip YA14D170/210/250 serving as the ADC, and then the digital signal is transmitted to the FPGA for processing; and when the communication modules send a signal, a digital signal from the FPGA is received by the chip YA14D170/210/250 serving as the DAC and converted into an analog signal, and the analog signal is transmitted to the radio frequency front-end and amplified by the radio frequency front-end, and then the amplified analog signal is sent out by the transmitting antenna.

In some embodiments, the vehicle may further include a signal processing device. The signal processing device may include one or more of a software defined radio (SDR) unit, a software radio driver (USRP hardware driver, UHD) unit, a system library, a system call interface, and a kernel (Kernel) unit.

Here, the main function of the SDR unit is to process baseband data of the system. Data transmission is performed in the SDR unit via multi-layer network protocols, such as a physical (PHY) layer, a medium access control (MAC) layer, a radio link control (RLC) layer, and a group data convergence protocol (PDCP) layer, a radio resource control (RRC) layer, and a network attached storage (NAS) layer. The SDR can serve as a signal generation source or a signal processing terminal. The signal generation source can generate an initial signal (that is, the initial signal received by the aforementioned FPGA). The signal processing terminal can be used to parse and process the received signal. For example, the signal processing terminal may parse and process a signal from the FPGA.

It will be noted that SDR is a radio broadcast communication technology, which is based on a software-defined wireless communication protocol rather than hard-wiring. In other words, frequency bands, air interface protocols and functions can be upgraded through software downloads and updates without completely replacing the hardware.

As an implementation, the signal processing device and the communication modules may be connected through a universal serial bus 3.0 (USB 3.0).

In an example, when a vehicle transmits a signal, as shown in FIG. 6, the signal transmission process may include actions in which: the signal processing device sends the baseband data in the system to the sending control unit in the FPGA through the USB 3.0 interface; the sending control unit forwards the baseband data to the digital up-conversion (DUC) unit in the FPGA; the digital up-conversion unit performs a frequency conversion processing on the baseband data; and the DAC converts the processed baseband data into data of analog domain in order to complete a digital-to-analog conversion; further, the converted analog signal is filtered through a low-pass filter (Filter) to obtain an intermediate frequency analog domain signal; the intermediate frequency analog domain signal is multiplied by a signal generated by the crystal oscillator, so that the intermediate frequency analog domain signal is modulated to a preset radio frequency point to form a radio frequency signal; and then the radio frequency signal is transmitted by the antenna through the power amplifier.

In another example, when a vehicle receives a signal, as shown in FIG. 7, the signal receiving process may include actions in which: the vehicle receives an analog signal through a receiving antenna; after passing through a low-noise amplifier, the analog signal is multiplied by a signal generated by a crystal oscillator, so that the signal becomes an intermediate frequency signal; and then the intermediate frequency signal is filtered by a low-pass filter (Filter) to obtain a filtered intermediate frequency signal; further, the intermediate frequency signal is converted into a digital signal by the ADC; the digital signal is sent to the FPGA; the digital down-conversion (DDC) unit in the FPGA down-converts the digital signal from the intermediate frequency to the baseband signal; and then the receiving control unit in the FPGA sends the baseband signal to the signal processing device through the USB 3.0 interface.

The software update method provided by embodiments of the present disclosure will be described below with reference to the network architecture shown in FIG. 2.

As shown in FIG. 8, embodiments of the present disclosure provide a software update method, and the method includes the following steps (S201 to S204).

In S201, after obtaining updated version information of target software, a first control node broadcasts first indication information. Accordingly, a target vehicle receives the first indication information from the first control node.

Here, the first control node may be the control node in FIG. 2 or a device (such as a chip) in the control node. The first control node may be a server, a vehicle, a mobile terminal, or the like. The target vehicle may be a vehicle establishing a communication connection with the first control node. For example, the target vehicle may be Vehicle 1 or Vehicle 2 in FIG. 2.

It will be noted that in a case where the first control node is a vehicle, a distance between the target vehicle and the first control node is less than or equal to a preset distance, that is, the target vehicle is located within a broadcast range of the first control node.

For example, in a case where the first control node is a first vehicle, the distance between the target vehicle and the first vehicle is less than or equal to the preset distance. The first vehicle may be Vehicle 3 in FIG. 2. The preset distance is equivalent to a broadcast distance of the first indication information broadcast by the first vehicle, that is, in a case where the distance between the target vehicle and the first vehicle is less than or equal to the preset distance, the target vehicle can successfully receive the first indication information broadcast by the first vehicle.

Here, the first indication information is used to instruct the vehicle to report current version information of the target software as configured, or the first indication information may be used to trigger the vehicle to report the current version information of the target software as configured. For example, the first indication information may include an identification of the target software (such as a name and a software serial number).

It will be noted that the target software may be any vehicle software, for example, the target software may be an application program (Application, APP) of the vehicle terminal on the target vehicle, or may be a vehicle-machine system configured on the target vehicle. The update of the target software by technicians may be an upgrade of the target software, or a repair of a vulnerability (BUG) in the target software.

As a possible implementation, after determining that the target software is updated, the first control node may broadcast the first indication information.

In an example, in a case where the first control node is a server, the server may determine that the target software is updated in response to a technician's operation of updating data of the target software stored in the server. The server may actively broadcast the first indication information or broadcast the first indication information in response to a triggering operation for the technician, so as to notify the vehicle configured with the target software to perform an upgrade. The triggering operation may mean that the technician determines that the data of the target software stored in the server has been updated. For example, the triggering operation may be an operation for the technician to disconnect a device from the server.

For example, in combination with the implementation shown in FIG. 1, the technician can use the maintenance device to store data of the updated target software in the server, and when the storage is completed, the technician disconnects the maintenance device from the server. Accordingly, the server broadcasts the first indication information in response to the technician's operation of disconnecting the device from the server.

In combination with the implementation shown in FIG. 9, the technician can also issue an upgrade signaling for the target software to the server through the maintenance device. The signaling includes update data and updated version information of the target software. After receiving the upgrade signaling for the target software, the server broadcasts the update data and updated version information for the target software to multiple vehicles through the OTA gateway.

In another example, in a case where the first control node is a vehicle, the vehicle broadcasts the updated version information in the form of broadcast after completing the update of the target software configured on itself. In this way, vehicles whose distance to this vehicle is less than the preset distance can receive the updated version information.

For example, after the vehicle finishes the update of the target software configured on itself, the vehicle can broadcast the updated version information to nearby vehicles through a wireless local area network (Wi-Fi), or can broadcast the updated version information to nearby vehicles through Bluetooth.

In another example, in a case where the first control node is a mobile terminal (such as a smart phone, a smart watch, or the like), the mobile terminal can obtain an installation package corresponding to the APP from the server in response to the user's download operation on the mobile terminal, and implement the installation of the APP according to the installation package. After a manufacturer of the target vehicle updates the target software, the latest version information of the target software is sent to the APP on the mobile terminal through a cloud server. After receiving the latest version information of the target software sent by the cloud server, the mobile terminal reminds the user that there is a new version of the target software to be updated through the APP on the mobile terminal. The user can click on the APP to confirm the update to trigger the update of the target software. Accordingly, after receiving the operation of confirming the update clicked by the user, the mobile terminal broadcasts the updated version information of the target software to nearby vehicles (including the users own vehicle) in the form of broadcast.

For example, the mobile terminal can broadcast the updated version information to the nearby vehicles through its own hotspot; alternatively, the mobile terminal can broadcast the updated version information to the nearby vehicle through Bluetooth; alternatively, the mobile terminal can broadcast the updated version information through the communication network.

In S202, the target vehicle sends the current version information of the target software as configured to the first control node. Accordingly, the first control node receives the current version information sent by the target vehicle.

Here, the current version information of the target software is used to reflect a version of the target software currently installed in the target vehicle. For example, the version information may include a version number indicating the target software. For example, a version number may include one or more digits or characters. For example, the version number may be: a protocol name/product name (A) of the target software, a serial number (B) of the target software, a major version number (C) of the target software, a minor version number (D) of the target software, a subversion number (E) of the target software, a date version number (F) of the target software, a stage version number (G) of the target software, or the like.

In an example, after receiving the version information of the target software reported by the target vehicle, the first control node may detect whether the version information of the target software reported by the target vehicle is the same as the updated version information of the target software. If the two pieces of version information are different, the first control node executes the following S203; if the pieces of two version information are the same, the first control node does not execute the following S203, or executes the above S201 repetitively. In this way, it may be ensured that the broadcast range of the first indication information is expanded to cover more vehicles, so that more vehicles can report their own version information in time.

It will be noted that in a case where a device as the first control node is different, a manner of detecting the version information of the software is also different.

For example, in a case where the first control node is a server, the server compares software version information sent by the target vehicle with version information stored in the server after the manufacturer updates the target software, and determines whether the two pieces of version information are the same.

For another example, in a case where the first control node is a first vehicle, the first vehicle compares software version information sent by the target vehicle with the version information of the target software configured on itself, and determines whether the two pieces of version information are the same.

For yet another example, in a case where the first control node is a mobile terminal, the mobile terminal compares software version information sent by the target vehicle with the updated version information of the target software issued by the server, and determines whether the two pieces of version information are the same.

In some embodiments, if it is determined that the current version information of the target software configured on the target vehicle is the same as the updated version information of the target software, the first control node may further send prompt information to the target vehicle to prompt that the target software of the target vehicle is the latest version.

In S203, the first control node sends second indication information to the target vehicle. Accordingly, the target vehicle receives the second indication information sent by the first control node.

Here, the second indication information is used to indicate the updated version information of the target software. For example, the second indication information may include version information and/or a uniform resource locator (URL).

In S204, the target vehicle updates the target software according to the second indication information.

Here, updating the target software by the target vehicle according to the second indication information may mean that the target vehicle obtains update data corresponding to the target software according to the second indication information, and updates the target software according to the update data obtained. The update data corresponding to the target software may be a firmware package. After receiving the second indication information sent by the first control node, the target vehicle downloads the latest version of the firmware package corresponding to the target software from the first control node.

In an example, the second indication information includes the updated version information of the target software. After receiving the second indication information, the target vehicle sends download request information including updated version information of the target software to the first control node, so as to request to download update data of the target software corresponding to the version information. After receiving the download request information of the target vehicle, the first control node sends the update data of the target software corresponding to the version information in the download request information to the target vehicle. After receiving the update data of the target software, the target vehicle updates the target software according to the update data.

In some embodiments, the download request information may further include a current download progress of the target vehicle for the target software. Here, the current download progress is used to reflect a part, downloaded by the target vehicle, of the update data of the target software. After receiving the download request information of the target vehicle, the first control node sends an un-downloaded part of the update data of the target software by the target vehicle to the target vehicle.

In another example, the second indication information includes the URL. After receiving the second indication information sent by the first control node, the target vehicle can obtain the update data corresponding to the target software from a download address corresponding to the URL according to the URL in the second indication information. Further, the target vehicle updates the target software according to the update data. Here, the download address corresponding to the URL may be the first control node or other control nodes.

During the process of downloading the update data of the target software by the target vehicle according to the second indication information, if the target vehicle is disconnected from the first control node, the target vehicle will continue to download the update data from another control node by means of interrupting the transmission. For example, the description of the following embodiments may be used.

After obtaining the update data of the target software, the target vehicle updates the target software according to the update data of the target software. For example, the target vehicle can decompress the firmware package to replace data of the current version of the target software, thereby completing the update of the target software.

In the above embodiments, the target vehicle receives the first indication information for instructing to report the version information of the target software, so as to send the current version information of the target software configured on the target vehicle to the first control node currently establishing a communication connection; further, the target vehicle receives the second indication information sent by the first control node for indicating the updated version information of the target software, so as to update the target software according to the second indication information. In this way, it is possible to update software on vehicles distributed in various places without the need for the users to drive their vehicles to a designated place for software update by the professional technicians, thereby improving the update efficiency of the vehicle software.

In some embodiments, after finishing updating the target software, the target vehicle may further feed back a first response message to the first control node, to indicate that the target software configured on the target vehicle is updated successfully. Accordingly, after receiving the first response message sent by the target vehicle, the first control node displays that the update of the target vehicle is successful.

For ease of understanding, embodiments of the present application provide a description of a specific update process in which the target vehicle performs the update of the target software through the first control node of a different form.

Example 1, FIG. 10 shows a process of updating the target software by the target vehicle in a case where the first control node is a server.

Here, the version information and the firmware package of the target software updated by the manufacturer are stored in the server.

The target vehicle reports the current version information of the target software configured on itself to the server through a public network. After receiving the current version information reported by the target vehicle, the server compares the version information of the target software updated by the manufacturer with the current version information of the target software reported by the target vehicle to determine whether the two pieces of version information are the same. If the two pieces of version information are different, the server sends the second indication information including the URL to the target vehicle, so as to instruct the target vehicle to update the target software. After receiving the second indication information, the target vehicle downloads the updated firmware package of the target software from the server through the public network according to the URL in the second indication information, and simultaneously, the server displays the download progress of the target vehicle. After downloading the firmware package, the target vehicle decompresses the firmware package to cause the decompressed firmware package to overwrite the data of the current version of the target software, thereby completing the update of the target software, and then the target vehicle feeds back the first response message to the server. Accordingly, after receiving the first response message fed back by the target vehicle, the server displays that the target vehicle has successfully updated the target software.

It will be understood that in the above example, the target vehicle obtains the updated target software from the server through the public network, and the target software can be automatically upgraded without notifying the user, and the data transmission rate can be guaranteed.

Example 2, FIG. 11 shows a process of updating the target software by the target vehicle in a case where the first control node is the first vehicle.

Here, the updated target version information and firmware package of the target software are stored in the first vehicle, and a distance between the first vehicle and the target vehicle is less than or equal to a preset distance.

The target vehicle reports the current version information of the target software configured on itself to the first vehicle. After receiving the current version information reported by the target vehicle, the first vehicle compares the version information of the updated target software with the current version information of the target software reported by the target vehicle to determine whether the two pieces of version information are the same. If the two pieces of version information are different, the first vehicle sends the second indication information including the URL to the target vehicle, so as to instruct the target vehicle to update the target software. After receiving the second indication information, the target vehicle downloads the updated firmware package of the target software from the first vehicle according to the URL in the second indication information, and simultaneously, the first vehicle displays the download progress of the target vehicle. After downloading the firmware package, the target vehicle decompresses the firmware package to cause the decompressed firmware package to overwrite the data of the current version of the target software, thereby completing the update of the target software, and then the target vehicle feeds back the first response message to the first vehicle. Accordingly, after receiving the first response message fed back by the target vehicle, the first vehicle displays that the target vehicle has successfully updated the target software.

It will be understood that in the above example, the target vehicle obtains the updated target software from the first vehicle, which is beneficial to a no blind spot coverage of the vehicle software upgrade, which is similar to contagion. After some vehicles are upgraded, if any vehicle of a same model that exists in a space at the same time as these vehicles, a data transmission can be carried out; and the vehicle software can be upgraded after the data transmission is completed, and the upgrade is no longer dependent on the public network, which improves the coverage area.

Example 3, FIG. 12 shows a process of updating the target software by the target vehicle in a case where the first control node is a mobile terminal.

Here, the updated target version information and firmware package of the target software are stored in the mobile terminal, and a distance between the mobile terminal and the target vehicle is less than or equal to a preset distance.

The target vehicle reports the current version information of the target software configured on itself to the mobile terminal. After receiving the current version information reported by the target vehicle, the mobile terminal compares the version information of the updated target software with the current version information of the target software reported by the target vehicle to determine whether the two pieces of version information are the same. If the two pieces of version information are different, the mobile terminal sends the second indication information including the URL to the target vehicle, so as to instruct the target vehicle to update the target software. After receiving the second indication information, the target vehicle downloads the updated firmware package of the target software from the mobile terminal according to the URL in the second indication information, and simultaneously, the mobile terminal displays the download progress of the target vehicle. After downloading the firmware package, the target vehicle decompresses the firmware package to cause the decompressed firmware package to overwrite the data of the current version of the target software, thereby completing the update of the target software, and then the target vehicle feeds back the first response message to the mobile terminal. Accordingly, after receiving the first response message fed back by the target vehicle, the mobile terminal displays that the target vehicle has successfully updated the target software.

It will be understood that in the above example, the target vehicle obtains the updated target software from the mobile terminal, and in a case where a new version of the target software appears, the user is reminded in time through the APP on the mobile terminal, so that the user may upgrade the target software in time. And users can choose whether to upgrade according to their own wishes, which meets individual needs and improves user experience.

In some embodiments, the target vehicle can continue to download the update data from other control nodes by interrupting the transmission in order to avoid the following situation during the download process: the target vehicle cannot continue to download the update data of the target software from the first control node due to the disconnection of the target vehicle from the first control node, resulting in the failure of the update of target software. As shown in FIG. 13, the above S204 provided in embodiments of the present disclosure includes the following steps (S2041 to S2043).

In S2041, the target vehicle establishes a communication connection with a second control node.

As a possible implementation, in the process of obtaining the update data corresponding to the target software from the first control node by the target vehicle, when the distance between the target vehicle and the first control node is greater than the preset distance, the target vehicle is disconnected from the first control node. Further, when the distance between the target vehicle and the second control node is less than or equal to the preset distance, the target vehicle establishes a communication connection with the second control node. The second control node is a control node configured with updated installation data of the target software. The second control node may be a server, a vehicle, a mobile terminal, or the like.

It should be noted that the second control node and the first control node may be a same control node, or may be different control nodes. In a case where the second control node and the first control node are the same control node, it may mean that after the target vehicle is disconnected from the first control node, the target vehicle establishes a connection with the first control node again. For example, when the user stops driving the target vehicle (for example, after the vehicle is turned off), the target vehicle cannot continue to communicate normally and is disconnected from the first control node; and subsequently, after the target vehicle is started again, the target vehicle can work normally and can establish a connection with the first control node again. For another example, when the target vehicle moves outside the broadcast range or coverage of the first control node, the target vehicle disconnects from the established connection with the first control node, and subsequently, when the target vehicle drives into the broadcast range or coverage of the first control node again, the target vehicle establishes the connection with the first control node again.

It will be understood that due to the mobility of the vehicle, the distance between the target vehicle and the first control node may change during the process of obtaining the update data corresponding to the target software from the first control node by the target vehicle. When the distance between the target vehicle and the first control node is greater than the preset distance, the target vehicle is disconnected from the first control node. At this time, the target vehicle cannot continue to obtain the update data corresponding to the target software from the first control node. When the distance between the target vehicle and the second control node is less than or equal to the preset distance, the target vehicle establishes a communication connection with the second control node.

For example, the first control node is the first vehicle, and during the process obtaining the update data corresponding to the target software from the first vehicle by the target vehicle, due to the movement of the target vehicle or the first vehicle, the distance between the two is greater than the preset distance, thereby causing the target vehicle to be disconnected from the first vehicle. Further, a distance between the target vehicle and a third vehicle is less than or equal to the preset distance, and the target vehicle establishes a communication connection with the third vehicle. That is, the first control node and the second control node are different control nodes.

In yet another example, the first control node is the first vehicle, and during the process of obtaining the update data corresponding to the target software from the first vehicle by the target vehicle, due to the movement of the target vehicle or the first vehicle, the distance between the two is greater than the preset distance, thereby causing the target vehicle to be disconnected from the first vehicle. Further, the target vehicle enters the coverage of the first vehicle again, that is, the distance between the target vehicle and the first vehicle is less than or equal to the preset distance again, and in this case, the target vehicle and the first vehicle establish a communication connection again. That is, the first control node and the second control node are the same node.

In S2042, the target vehicle sends first request information to the second control node.

Here, the first request information is used to request to obtain target data, where the target data is all or part of the update data corresponding to the target software.

As a possible implementation, after the target vehicle establishes a communication connection with the second control node, the target vehicle sends the first request information to the second control node to request to obtain the all or part of the update data corresponding to the target software.

In some embodiments, if the target vehicle has already downloaded a part of the update data corresponding to the target software from the first control node when the target vehicle is disconnected from the first control node, the first request information is used to request to obtain the remaining part of the update data corresponding to the target software that has not been downloaded by the target vehicle. For example, the first request information may include a current download progress of the update data of the target software by the target vehicle. If the update data corresponding to the target software has not been downloaded from the first control node when the target vehicle is disconnected from the first control node, the first request information is used to request to obtain all of the update data corresponding to the target software.

Accordingly, the second control node receives the first request information sent by the target vehicle, and sends the target data to the target vehicle according to the first request information.

In S2043, after obtaining the update data, the target vehicle updates the target software according to the update data.

As a possible implementation, after obtaining the target data from the second control node, the target vehicle obtains all of the update data of the target software. Further, the target vehicle updates the target software according to the update data corresponding to the target software.

In a design, as shown in FIG. 14, after the target vehicle finishes the update of the target software, the software update method provided in embodiments of the present disclosure may further include the following steps (S301 to S304j.

In S301, the target vehicle broadcasts the first indication information.

It will be understood that the target vehicle has completed the update of the target software in this case, that is, the target vehicle already has the updated version information of the target software, so the target vehicle can continue to assist other vehicles as the first control node to update the target software, thereby expanding the update coverage of the target software.

In S302, the target vehicle receives current version information of the target software configured on the second vehicle sent by the second vehicle.

Here, the second vehicle establishes a communication connection with the target vehicle.

It will be understood that a distance between the second vehicle and the target vehicle is less than or equal to the preset distance. After finishing the update of the target software, the target vehicle broadcasts the first indication information to nearby vehicles. Accordingly, after receiving the first indication information from the target vehicle, the nearby vehicles send current version information of the target software configured respectively to the target vehicle.

In S303, the target vehicle determines whether the current version information of the target software configured on the second vehicle is the same as the updated version information of the target software according to the current version information sent by the second vehicle.

For the specific implementation of this step, reference may be made to the above S203, which will not be repeated here.

In S304, if the current version information of the target software configured on the second vehicle is different from the updated version information of the target software, the target vehicle sends third indication information to the second vehicle.

Here, the third indication information is used to indicate the updated version information of the target software.

It will be understood that since the target vehicle has completed the update of the target software in this case, if the version information of the target software reported by the second vehicle is different from the version information of the target software configured on the target vehicle itself, the target vehicle considers that the target software on the second vehicle needs to be updated. Therefore, the target vehicle will send the third indication information to the second vehicle. Accordingly, after receiving the third indication information, the second vehicle starts the updating process of the target software.

It should be noted that the function of the third indication information is the same as that of the second indication information, both of which are to indicate the updated version information of the target software to the vehicle, so that the vehicle starts the update process of the target software. The difference is that after receiving the third indication information, the second vehicle will obtain the update data corresponding to the target software from the target vehicle; and after receiving the second indication information, the target vehicle will obtain the update data corresponding to the target software from the first control node.

In a design, as shown in FIG. 15, the software update method provided in embodiments of the present disclosure may further include the following steps (S401 to S403).

In S401, the first control node establishes a communication connection with a third vehicle.

It will be understood that, in addition to the update process of the target software with the target vehicle, the first control node may further establish a communication connection with the third vehicle, so as to meet the update requirements of the third vehicle for the target software.

In S402, the first control node receives first request information from the third vehicle.

Here, the first request information is used to request to obtain target data, where the target data is all or part of the update data corresponding to the target software.

For the specific implementation of this step, reference may be made to the above S2052, which will not be repeated here.

In S403, the first control node sends the target data to the third vehicle according to the first request information.

Here, the target data is all or part of the update data corresponding to the target software.

For the specific implementation of this step, reference may be made to the above S2052, which will not be repeated here.

It should be pointed out that the various embodiments of the present disclosure may be mutually referenced or used as a reference, for example, the same or similar steps, method embodiments, system embodiments and device embodiments may refer to each other without limitation.

Embodiments of the present disclosure may divide the software update device into functional modules or functional units according to the above method examples, for example, individual functional modules or functional units may be divided corresponding to individual functions, or two or more functions may be integrated in a single processing module. The above integrated modules may be realized either in the form of hardware or in the form of software function modules or function units. Here, the division of the modules or units in the embodiments of the present disclosure is illustrative and is only a logical functional division, and there may be other division methods for actual implementations.

FIG. 16 is a structural diagram of a software update device provided by embodiments of the present disclosure. The software update device is applied to the target vehicle, and the device includes: a receiving unit 501, a sending unit 502 and a processing unit 503.

The receiving unit 501 is configured to receive first indication information, the first indication information being used to instruct to report version information of the target software. The sending unit 502 is configured to send current version information of the target software configured on the target vehicle to a first control node currently establishing a communication connection. The receiving unit 501 is further configured to receive second indication information sent by the first control node, the second indication information being used to indicate updated version information of the target software. The processing unit 503 is configured to update the target software according to the second indication information.

In some embodiments, the first control node includes any one of: a server, a first vehicle and a mobile terminal, where the first vehicle includes the updated version information of the target software.

In some embodiments, in a case where the first control node is the first vehicle, a distance between the first vehicle and the target vehicle is less than or equal to a preset distance.

In some embodiments, in a case where the first control node is the mobile terminal, the receiving unit 501 is specifically configured to: receive the first indication information sent by the mobile terminal, where the first indication information is generated by the mobile terminal in response to a first operation of a user, the first operation being an operation for the user to update the version information of the target software.

In some embodiments, the second indication information includes a uniform resource locator (URL), the URL being associated with the updated version information; the processing unit 503 is specifically configured to: obtain update data corresponding to the target software from the first control node according to the URL, and update the target software according to the update data.

In some embodiments, the processing unit 503 is specifically configured to: cause the target vehicle to establish a communication connection with a second control node in response to a result that the target vehicle is disconnected from the first control node during a process of obtaining update data corresponding to the target software from the first control node, and continue to obtain the update data from the second control node according to the second indication information; and update the target software according to the update data after obtaining the update data.

In some embodiments, the sending unit 502 is further configured to broadcast the first indication information after the processing unit 503 updates the target software according to the second indication information. The receiving unit 501 is further configured to receive current version information of the target software configured on the second vehicle sent by the second vehicle, the second vehicle establishes a communication connection with the target vehicle. The processing unit 503 is further configured to determine whether the current version information of the target software configured on the second vehicle is same as the updated version information of the target software according to the current version information sent by the second vehicle. The sending unit 502 is further configured to send third indication information to the second vehicle in a case where the current version information of the target software configured on the second vehicle is different from the updated version information of the target software, the third indication information being used to indicate the updated version information of the target software.

In some embodiments, the sending unit 502 is further configured to: send a first response message to the first control node after the processing unit 503 updates the target software according to the second indication information, the first response message being used to indicate that the target software configured on the target vehicle is updated successfully.

FIG. 17 is another structural diagram of a software update device provided by embodiments of the present disclosure. The software update device is applied to the first control node, and the device includes: a sending unit 601, a receiving unit 602 and a processing unit 603.

The sending unit 601 is configured to broadcast first indication information after obtaining updated version information of target software, the first indication information being used to instruct the vehicle to report current version information of the target software as configured. The receiving unit 602 is configured to receive the current version information sent by the target vehicle, the first control node being communicatively connected with the target vehicle. The processing unit 603 is configured to send second indication information to the target vehicle in a case where it is determined that the current version information of the target software configured on the target vehicle is different from the updated version information of the target software, the second indication information being used to indicate the updated version information of the target software.

In some embodiments, the processing unit 603 is further configured to: establish a communication connection with a third vehicle; receive first request information from the third vehicle, the first request information being used to request to obtain target data, where the target data is all or part of update data corresponding to the target software; and send the target data to the third vehicle according to the first request information.

In some embodiments, the first control node includes any one of: a server, a vehicle and a mobile terminal.

In some embodiments, in a case where the first control node is the vehicle, a distance between the vehicle and the target vehicle is less than or equal to a preset distance.

When implemented by hardware, in FIG. 16, the receiving unit 501 and the sending unit 502 may be integrated on a communication interface, and the processing unit 503 may be integrated on a processor; alternatively, in FIG. 17, the sending unit 601 and the receiving unit 602 may be integrated on a communication interface, and the processing unit 603 may be integrated on a processor. The specific implementation is shown in FIG. 18.

FIG. 18 is a structural diagram of a possible communication device for the software update devices involved in the above embodiments. The communication device includes: a processor 1102 and a communication interface 1103. The processor 1102 is used to control and manage actions of the device, for example, to execute the steps executed by the processing unit 603, and/or to execute other processes of the technologies described herein. The communication interface 1103 is used to support communication between the device and other network entities, for example, to perform the steps performed by the receiving unit 602. The device may further include a memory 1101 and a bus 1104, and the memory 1101 is used to store program codes and data of the device.

Here, the memory 1101 may be a memory in the device, and the memory may include a volatile memory, such as a random access memory; alternatively, the memory may include a non-volatile memory, such as a read-only memory, a flash memory, a hard disk or a solid-state hard disk; alternatively, the memory may include a combination of memories of the above-mentioned types.

The above-mentioned processor 1102 may be a variety of exemplary logic boxes, modules, and circuits implementing or executing the content described in conjunction with the present disclosure. The processor may be a central processing unit, a general purpose processor, a digital signal processor, an application specific integrated circuit, a field-programmable gate array, or other programmable logic device, a transistor logic device, a hardware component, or any combination thereof. The processor can implement or execute the various exemplary logical blocks, modules and circuits described in connection with the present disclosure. Alternatively, the processor may be a combination of computing functions, for example, a combination containing one or more microprocessors, a combination of a digital signal processor (DSP) and a microprocessor, or the like.

The bus 1104 may be an extended industry standard architecture (EISA) bus or the like. The bus 1104 may be divided into an address bus, a data bus, a control bus, and the like. For ease of representation, only one thick line is used in FIG. 18, but it does not mean that there is only one bus or one type of bus.

The device in FIG. FIG. 18 may also be a chip. The chip includes one or more than two (including two) processors 1102 and a communication interface 1103.

In some embodiments, the chip further includes a memory 1101. The memory 1101 may include a read-only memory and a random access memory, and provides operation instructions and data to the processor 1102. A part of the memory 1101 may include a non-volatile random access memory (NVRAM).

In some implementations, the memory 1101 stores elements, execution modules or data structures, or their subsets, or their extended sets.

In embodiments of the present disclosure, corresponding operations are executed by calling the operation instructions stored in the memory 1101 (the operation instructions may be stored in the operating system).

Some embodiments of the present disclosure provide a computer-readable storage medium (for example, a non-transitory computer-readable storage medium), the computer-readable storage medium has stored a computer program instruction, and the computer program instruction, when executed on a computer (for example, an electric device), causes the computer to perform the software update method as described in any of the above embodiments.

For example, the computer-readable storage medium includes, but is not limited to, a magnetic storage device (e.g., a hard disk, a floppy disk or a magnetic tape), an optical disk (e.g., a compact disk (CD), or a digital versatile disk (DVD)), a smart card, and a flash memory device (e.g., an erasable programmable read-only memory (EPROM), a card, a stick or a key driver). Various computer-readable storage media described in the present disclosure may represent one or more devices and/or other machine-readable storage medium for storing information. The term "machine-readable storage medium" may include, but is not limited to, wireless channels and various other media capable of storing, containing and/or carrying instructions and/or data.

Some embodiments of the present disclosure provide a computer program product, for example, the computer program product stores on a non-transitory computer-readable storage medium. The computer program product includes a computer program instruction, and when the computer program instruction is executed on a computer (for example, an electronic device), the computer program instructions cause the computer to perform the software update method as described in the above embodiments.

Some embodiments of the present disclosure provide a computer program. When the computer program is executed on a computer (for example, an electronic device), the computer program causes the computer to perform the software update method as described in the above embodiments.

Beneficial effects of the computer-readable storage medium, the computer program product, and the computer program are same as the beneficial effects of the software update method as described in some embodiments described above, and details will not be repeated here.

In several embodiments provided in the present disclosure, it will be understood that the disclosed systems, devices and methods may be implemented through other manners. For example, embodiments of the devices described above are merely exemplary. For example, the division of the units is only a logical functional division. In actual implementation, there are another division manners. For example, a plurality of units or modules may be combined or integrated to another system, or some features may be ignored or not executed. Moreover, the mutual coupling or direct coupling or communication connection as shown or discussed may be an indirect coupling or communication connection through some interfaces, devices or units, and may be in an electrical, mechanical or other form.

The units described as separate components may or may not be physically separated, and a component shown as a unit may or may not be a physical unit, that is, the component may be located in one place, or may be distributed to multiple network units. Some or all of the units may be selected according to actual needs to achieve the purposes of the solutions in the embodiments.

Additionally, the functional units in the embodiments of the present disclosure may be integrated into a single processing module 503 or may be separate physical units, or two or more units may be integrated into a single unit.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A software update method, applied to a target vehicle, the target vehicle being configured with target software, and the method comprising:

receiving, by the target vehicle, first indication information, the first indication information being used to instruct to report version information of the target software;

sending, by the target vehicle, current version information of the target software configured on the target vehicle to a first control node currently establishing a communication connection with the target vehicle;

receiving, by the target vehicle, second indication information sent by the first control node, the second indication information being used to indicate updated version information of the target software; and updating, by the target vehicle, the target software according to the second indication information, wherein updating, by the target vehicle, the target software according to the second indication information includes:

establishing, by the target vehicle, a communication connection with a second control node in response to a result that the target vehicle is disconnected from the first control node during a process of obtaining update data corresponding to the target software from the first control node, and continuing, by the target vehicle, to obtain the update data from the second control node according to the second indication information; and updating the target software according to the update data after obtaining the update data.

2. The software update method according to claim 1, wherein the first control node includes any one of: a server, a first vehicle and a mobile terminal, wherein the first vehicle carries the updated version information of the target software.

3. The software update method according to claim 2, wherein if the first control node is the first vehicle, a distance between the first vehicle and the target vehicle is less than or equal to a preset distance.

4. The software update method according to claim 2, wherein if the first control node is the mobile terminal, receiving, by the target vehicle, the first indication information includes:

receiving, by the target vehicle, the first indication information sent by the mobile terminal, wherein the first indication information is generated by the mobile terminal in response to a first operation, the first operation being an operation for updating the version information of the target software.

5. The software update method according to claim 1, wherein the second indication information includes a uniform resource locator (URL), the URL being associated with the updated version information; and updating, by the target vehicle, the target software according to the second indication information includes:

obtaining update data corresponding to the target software from the first control node according to the URL, and updating the target software according to the update data.

6. The software update method according to claim 1, wherein after updating, by the target vehicle, the target software according to the second indication information, the method further comprises:

broadcasting, by the target vehicle, the first indication information;

receiving, by the target vehicle, current version information of the target software configured on the second vehicle sent by the second vehicle, the second vehicle establishing a communication connection with the target vehicle;

determining, by the target vehicle, whether the current version information of the target software configured on the second vehicle is same as the updated version information of the target software according to the current version information sent by the second vehicle; and if the current version information of the target software configured on the second vehicle is different from the updated version information of the target software, sending, by the target vehicle, third indication information to the second vehicle, the third indication information being used to indicate the updated version information of the target software.

7. The software update method according to claim 1, wherein after updating, by the target vehicle, the target software according to the second indication information, the method further comprises:

sending a first response message to the first control node, the first response message being used to indicate that the target software configured on the target vehicle is updated successfully.

8. A software update method, applied to a first control node, the method comprising:

broadcasting, by the first control node, first indication information after obtaining updated version information of target software, the first indication information being used to instruct a target vehicle to report current version information of the target software as configured;

receiving, by the first control node, the current version information sent by the target vehicle, wherein the first control node is communicatively connected with the target vehicle, and the target vehicle is configured with the target software; and if it is determined that the current version information of the target software configured on the target vehicle is different from the updated version information of the target software, sending, by the first control node, second indication information to the target vehicle, the second indication information being used to indicate the updated version information of the target software;

wherein the method further comprises:

establishing, by the first control node, a communication connection with a third vehicle;

receiving, by the first control node, first request information from the third vehicle, the first request information being used to request to obtain target data, wherein the target data is all or part of update data corresponding to the target software;

sending, by the first control node, the target data to the third vehicle according to the first request information; and updating, by the third vehicle, the target software according to the update data after obtaining the update data.

9. The software update method according to claim 8, wherein if the first control node is a first vehicle, a distance between the first vehicle and the target vehicle is less than or equal to a preset distance.

10. A software update device, applied to a target vehicle, the target vehicle being configured with target software, and the software update device comprising: a processor and a communication interface, wherein the communication interface is coupled to the processor, and the processor is configured to run computer programs or instructions to perform:

receiving first indication information, the first indication information being used to instruct to report version information of the target software;

sending current version information of the target software configured on the target vehicle to a first control node currently establishing a communication connection with the target vehicle;

receiving second indication information sent by the first control node, the second indication information being used to indicate updated version information of the target software; and updating the target software according to the second indication information;

wherein the processor is configured to run the computer programs or the instructions to perform:

establishing a communication connection with a second control node in response to a result that the target vehicle is disconnected from the first control node during a process of obtaining update data corresponding to the target software from the first control node, and continuing to obtain the update data from the second control node according to the second indication information; and updating the target software according to the update data after obtaining the update data.

11. The software update device according to claim 10, wherein the processor further is configured to run the computer programs or the instructions, in a case where the first control node is a mobile terminal, to perform:

receiving the first indication information sent by the mobile terminal, wherein the first indication information is generated by the mobile terminal in response to a first operation, the first operation being an operation for updating the version information of the target software.

12. The software update device according to claim 10, wherein the second indication information includes a uniform resource locator (URL), the URL being associated with the updated version information; the processor further is configured to run the computer programs or the instructions to perform:

obtaining update data corresponding to the target software from the first control node according to the URL, and updating the target software according to the update data.

13. The software update device according to claim 10, wherein the processor further is configured to run the computer programs or the instructions to further perform:

broadcasting the first indication information;

receiving current version information of the target software configured on a second vehicle sent by the second vehicle, the second vehicle establishes a communication connection with the target vehicle;

determining whether the current version information of the target software configured on the second vehicle is same as the updated version information of the target software according to the current version information sent by the second vehicle; and sending third indication information to the second vehicle in a case where the current version information of the target software configured on the second vehicle is different from the updated version information of the target software, the third indication information being used to indicate the updated version information of the target software.

14. The software update device according to claim 10, wherein the processor further is configured to run the computer programs or the instructions to further perform:

sending a first response message to the first control node, the first response message being used to indicate that the target software configured on the target vehicle is updated successfully.

15. A non-transitory computer-readable storage medium, having stored instructions that, when executed on a computer, cause the computer to perform the software update method according to claim 1.

16. A software update device, applied to a target vehicle, the target vehicle being configured with target software, and the software update device comprising: a processor and a communication interface, wherein the communication interface is coupled to the processor, and the processor is used to run computer programs or instructions to implement the software update method according to claim 8.

17. A non-transitory computer-readable storage medium, having stored instructions that, when executed on a computer, cause the computer to perform the software update method according to claim 8.

* * * * *